United States Patent
Inui et al.

(10) Patent No.: US 10,266,629 B2
(45) Date of Patent: Apr. 23, 2019

(54) PRESSURE-SENSITIVE ADHESIVE COMPOSITION FOR OPTICAL FILM, PRESSURE-SENSITIVE ADHESIVE LAYER FOR OPTICAL FILM, PRESSURE-SENSITIVE ADHESIVE OPTICAL FILM, AND IMAGE DISPLAY DEVICE

(75) Inventors: Kunihiro Inui, Ibaraki (JP); Toshitsugu Hosokawa, Ibaraki (JP); Takaaki Ishii, Ibaraki (JP); Masayuki Satake, Ibaraki (JP); Kenichi Okada, Ibaraki (JP); Toshitaka Takahashi, Ibaraki (JP); Yousuke Makihata, Ibaraki (JP); Taiki Shimokuri, Ibaraki (JP); Shusaku Goto, Ibaraki (JP); Takeharu Kitagawa, Ibaraki (JP); Minoru Miyatake, Ibaraki (JP); Tomohiro Mori, Ibaraki (JP); Takashi Kamijo, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 284 days.

(21) Appl. No.: 13/641,904

(22) PCT Filed: May 16, 2011

(86) PCT No.: PCT/JP2011/061170
§ 371 (c)(1),
(2), (4) Date: Oct. 18, 2012

(87) PCT Pub. No.: WO2011/145552
PCT Pub. Date: Nov. 24, 2011

(65) Prior Publication Data
US 2013/0052457 A1    Feb. 28, 2013

(30) Foreign Application Priority Data

May 18, 2010 (JP) .................................. 2010-114542
Nov. 25, 2010 (JP) .................................. 2010-262690

(51) Int. Cl.
*C08F 265/06* (2006.01)
*C08F 220/06* (2006.01)
(Continued)

(52) U.S. Cl.
CPC ........... *C08F 265/06* (2013.01); *C09J 151/06* (2013.01); *C08F 220/18* (2013.01);
(Continued)

(58) Field of Classification Search
None
See application file for complete search history.

(56) References Cited

U.S. PATENT DOCUMENTS 6,156,378 A    12/2000  Koketsu et al.
6,503,631 B1    1/2003  Faverolle et al.
(Continued)

FOREIGN PATENT DOCUMENTS

CN    1547239 A    11/2004
CN    1730592 A    2/2006
(Continued)

OTHER PUBLICATIONS

Machine translation JP 2003-292922.*
(Continued)

*Primary Examiner* — Alexandre F Ferre
(74) *Attorney, Agent, or Firm* — Westerman, Hattori, Daniels & Adrian, LLP

(57) ABSTRACT

An aqueous dispersion-type pressure-sensitive adhesive composition for an optical film includes a emulsion particles of a core-shell structure, wherein the emulsion particles include a (meth)acryl-based copolymer (A) having a glass transition temperature of −55° C. to 0° C. and a (meth)acryl-based copolymer (B) having a glass transition temperature of 0° C. to 180° C., in a single emulsion particle, one of the copolymers (A) and (B) forms a core layer, and another
(Continued)

forms a shell layer, at least one of the copolymers (A) and (B) contains a carboxyl group-containing monomer, a difference of the glass transition temperatures between the copolymers (A) and (B) is 50° C. or more, and a ratio (A)/(B) (by weight) is in the range of 50/50 to 90/10.

16 Claims, 1 Drawing Sheet

(51) Int. Cl.
*C09J 151/06* (2006.01)
*C08F 220/18* (2006.01)

(52) U.S. Cl.
CPC .. *C08F 2220/1808* (2013.01); *G02F 2202/28* (2013.01); *Y10T 428/265* (2015.01); *Y10T 428/2848* (2015.01); *Y10T 428/2891* (2015.01)

(56) References Cited

U.S. PATENT DOCUMENTS

| | | | |
|---|---|---|---|
| 2002/0015807 A1* | 2/2002 | Sugino et al. | 428/1.31 |
| 2003/0137732 A1 | 7/2003 | Sugino et al. | |
| 2006/0188712 A1* | 8/2006 | Okada et al. | 428/354 |
| 2008/0281038 A1 | 11/2008 | Takahashi et al. | |
| 2010/0304135 A1 | 12/2010 | Okada et al. | |
| 2012/0213991 A1 | 8/2012 | Inui et al. | |

FOREIGN PATENT DOCUMENTS

| | | |
|---|---|---|
| CN | 1962793 A | 5/2007 |
| JP | 57-102957 A | 6/1982 |
| JP | 06-158012 A | 6/1994 |
| JP | 07-102232 A | 4/1995 |
| JP | 07-278517 A | 10/1995 |
| JP | 08-104858 A | 4/1996 |
| JP | 2002-309212 A | 10/2002 |
| JP | 2002-538484 A | 11/2002 |
| JP | 2003-279748 A | 10/2003 |
| JP | 2003-292922 A | 10/2003 |
| JP | 2007-186661 A | 7/2007 |
| JP | 2009-001673 A | 1/2009 |
| JP | 2011-090193 A | 5/2011 |
| WO | 2010/053862 A1 | 5/2010 |

OTHER PUBLICATIONS

Machine translation Shinoda et al. (JP 07-278517). (1995).*
International Search Report of PCT/JP2011/061170, dated Jul. 26, 2011.
Office Action dated Feb. 17, 2014, issued in Chinese Patent Application No. 201180024042.3 with Partial English Translation (24 pages).
Notification of Transmittal of Translation of the International Preliminary Report on Patentabililty (Form PCT/IB/338) of International Application No. PCT/JP2011/061170 dated Dec. 20, 2012 with Forms PCT/IB/373 and PCT/ISA/237.
Japanese Office Action dated Nov. 26, 2014, issued in Japanese Application No. 2011-107912; w/English translation. (6 pages).
Office Action dated Mar. 23, 2015, issued in corresponding Taiwanese Application No. 100117187, w/English translation. (10 pages).
Office Action dated Jun. 19, 2015, issued in counterpart Japanese Patent Application No. 2011-107912, with English translation (6 pages).
Office Action dated Jul. 11, 2017, issued in Korean Application No. 10-2012-7032713, with English translation (11 pages).

* cited by examiner

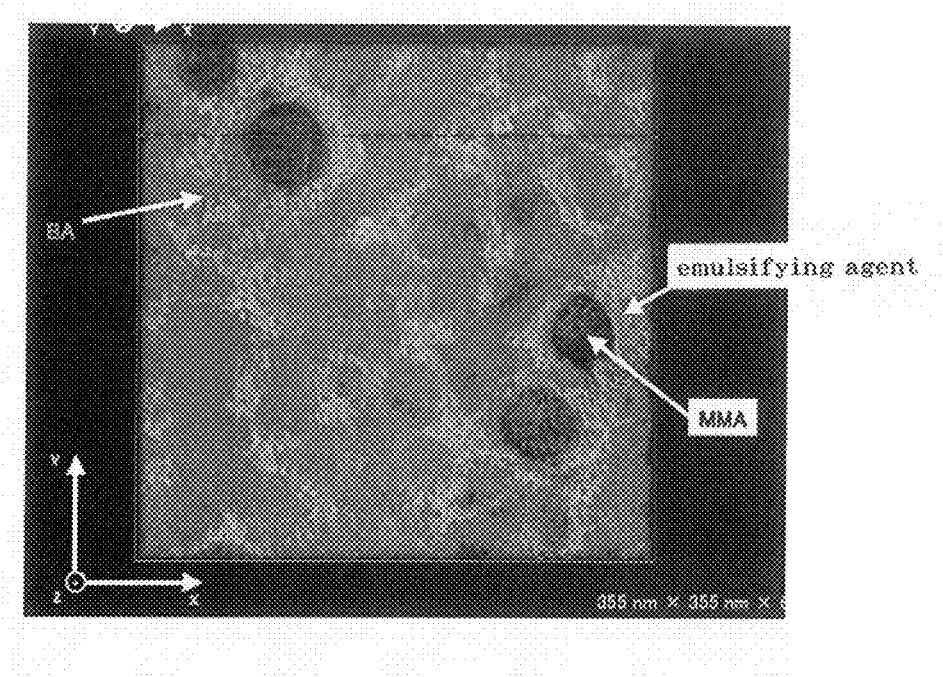

PRESSURE-SENSITIVE ADHESIVE COMPOSITION FOR OPTICAL FILM, PRESSURE-SENSITIVE ADHESIVE LAYER FOR OPTICAL FILM, PRESSURE-SENSITIVE ADHESIVE OPTICAL FILM, AND IMAGE DISPLAY DEVICE

TECHNICAL FIELD

The present invention relates to an aqueous dispersion-type pressure-sensitive adhesive composition for an optical film, and to a pressure-sensitive adhesive layer for an optical film made from the pressure-sensitive adhesive composition. The present invention also relates to a pressure-sensitive adhesive optical film including an optical film and the pressure-sensitive adhesive layer provided thereon. The present invention also relates to an image display device such as a liquid crystal display device, an organic electroluminescence (EL) display device, a cathode-ray tube (CRT), or a plasma display panel (PDP). Examples of the optical film that may be used include a polarizing plate, a retardation plate, an optical compensation film, a brightness enhancement film, a surface treatment film such as an anti-reflection film, and a laminate of any combination thereof.

DESCRIPTION OF THE RELATED ART

Liquid crystal display devices, organic EL display devices, etc. have an image-forming mechanism including polarizing elements as essential components. For example, therefore, in a liquid crystal display device, polarizing elements are essentially placed on both sides of a liquid crystal cell, and generally, polarizing plates are attached as the polarizing elements. Besides polarizing plates, various optical elements have been used in display panels such as liquid crystal panels and organic EL panels for improving display quality. Front face plates are also used to protect image display devices such as liquid crystal display devices, organic EL display devices, CRTs, and PDPs or to provide a high-grade appearance or a differentiated design. Examples of parts used in image display devices such as liquid crystal display devices and organic EL display devices or parts used together with image display devices, such as front face plates, include retardation plates for preventing discoloration, viewing angle-widening films for improving the viewing angle of liquid crystal displays, brightness enhancement films for increasing the contrast of displays, and surface treatment films such as hard-coat films for use in imparting scratch resistance to surfaces, antiglare treatment films for preventing glare on image display devices, and anti-reflection films such as anti-reflective films and low-reflective films. These films are generically called optical films.

When such optical films are bonded to a display panel such as a liquid crystal cell or an organic EL panel or bonded to a front face plate, a pressure-sensitive adhesive is generally used. In the process of bonding an optical film to a display panel such as a liquid crystal cell or an organic EL panel or to a front face plate or bonding optical films together, a pressure-sensitive adhesive is generally used to bond the materials together so that optical loss can be reduced. In such a case, a pressure-sensitive adhesive optical film including an optical film and a pressure-sensitive adhesive layer previously formed on one side of the optical film is generally used, because it has some advantages such as no need for a drying process to fix the optical film.

The optical film used in the pressure-sensitive adhesive optical film can easily shrink or expand under hot or humid conditions. Therefore, after the pressure-sensitive adhesive optical film is bonded to a display panel such as a liquid crystal cell or an organic EL panel or to a front face plate, lifting or peeling of the film can easily occur. Thus, the pressure-sensitive adhesive layer is required to be durable against heating, humidification, etc. Traditionally, organic solvent-type pressure-sensitive adhesives have been dominantly used for forming the pressure-sensitive adhesive layer of the pressure-sensitive adhesive optical film.

In recent years, solvent-free pressure-sensitive adhesives, which are produced with no organic solvent, have been developed aggressively in view of a reduction in global environmental loading or an improvement in process stability. Known solvent-free pressure-sensitive adhesives typically include aqueous dispersion-type pressure-sensitive adhesives containing a pressure-sensitive adhesive polymer component dispersed in water used as a dispersion medium. Unfortunately, since aqueous dispersion-type pressure-sensitive adhesives generally contain a surfactant, such as an emulsifying agent or a dispersing agent, as a water-soluble, dispersion-stabilizing component, pressure-sensitive adhesive layers made from such aqueous dispersion-type pressure-sensitive adhesives can be easily foamed under hot conditions due to the influence of the water-soluble component, and can often suffer from peeling or the like under humid conditions, so that they have a durability problem.

In the field of optical films, some proposals have been made to improve the durability. For example, it is proposed that an emulsion of an acryl-based polymer produced with an alkyl (meth)acrylate and a silane monomer should be used to form an aqueous dispersion-type pressure-sensitive adhesive for an optical film capable of improving adhesion to the glass substrate of a liquid crystal panel (Patent Document 1). It is also proposed that an emulsion of an acryl-based polymer produced with an alkyl (meth)acrylate and a phosphate group-containing monomer should be used to form an aqueous dispersion-type pressure-sensitive adhesive for an optical film capable of improving adhesion to the glass substrate of a liquid crystal panel under hot or humid conditions (Patent Document 2).

On the other hand, concerning an acrylic emulsion for use in applications other than optical films, for example, it is proposed that a wood adhesive-forming acrylic emulsion composition capable of having improved warm-water resistance or boiling resistance should be prepared by adding ammonium zinc carbonate to a core-shell-type acrylic emulsion having a two-layer structure including: a core layer of a copolymer of an aromatic vinyl monomer, an unsaturated carboxylic ester monomer, an amide group-containing acrylic monomer, and an unsaturated carboxylic acid, wherein the copolymer has a glass transition temperature (Tg) of −10 to +90° C.; and a shell layer of a copolymer of an aromatic vinyl monomer, an unsaturated carboxylic ester monomer, and an unsaturated carboxylic acid, wherein the copolymer has a glass transition temperature (Tg) of −50 to +20° C. (Patent Documents 3 and 4).

It is also proposed that an aqueous dispersion-type pressure-sensitive adhesive composition that exhibits good tackiness to an adhesion-resistant material such as polyethylene or polypropylene, is prevented from being reduced in cohesive strength at high temperature, and has high repulsion resistance can be produced by forming a copolymer with a glass transition temperature of 250 K or less through emulsion polymerization in an aqueous dispersion of a modifying polymer with a glass transition temperature of 273 K or more obtained from monomers including styrene and so on (Patent Document 5). An aqueous emulsion-type pressure-sensitive adhesive suitable for bonding to aluminized sheets, etc. is also proposed, which contains resin particles including a core-forming resin with a Tg of 15° C. or more and a shell-forming resin with a Tg of −30° C. or less, wherein both of the core- and shell-forming resins include a polymer obtained from a monomer mixture containing at least a (meth)acrylic acid ester, an α,β-ethylenic unsaturated carboxylic acid, and an aromatic ring- or saturated hydrocarbon ring-containing vinyl monomer, and it is disclosed that the aqueous emulsion-type pressure-sensitive adhesive has high water resistance and that the pressure-sensitive adhesive layer formed on a substrate maintains high adhesive strength even after immersed in water or stored at high humidity for a long time (Patent Document 6).

PRIOR ART DOCUMENTS

Patent Documents

Patent Document 1: JP-A-2002-309212
Patent Document 2: JP-A-2007-186661
Patent Document 3: JP-A-07-278517
Patent Document 4: JP-A-08-104858
Patent Document 5: JP-A-57-102957
Patent Document 6: JP-A-2003-292922

SUMMARY OF THE INVENTION

Problems to be Solved by the Invention

The aqueous dispersion-type pressure-sensitive adhesives disclosed in Patent Documents 1 and 2 have satisfactory adhesion (durability) under hot or humid conditions. Unfortunately, it has been newly found that the aqueous dispersion-type pressure-sensitive adhesive disclosed in each of Patent Documents 1 and 2 is such that a pressure-sensitive adhesive optical film produced therewith is not sufficiently prevented from peeling after taken out of a high-temperature moist environment, transferred to a room temperature environment, and then stored for a long time (hereinafter, this type of peeling is referred to as peeling over time).

The acrylic emulsion disclosed in each of Patent Documents 3 and 4, which is for use in a wood adhesive, is not intended to form a pressure-sensitive adhesive layer such as that in a pressure-sensitive adhesive optical film, and any adhesive layer made from the acrylic emulsion does not exhibit adherability because it contains ammonium zinc carbonate for improving warm-water resistance or boiling resistance. Therefore, the acrylic emulsion does not make it possible to form a pressure-sensitive adhesive layer such as that in a pressure-sensitive adhesive optical film and then to bond the pressure-sensitive adhesive layer and therefore cannot be used to form an optical film. The acrylic emulsion disclosed in each of Patent Documents 3 to 6, which is produced using an aromatic vinyl monomer as a main component, does not have sufficient transparency and therefore is not suitable for optical film applications.

An object of the present invention is to provide an aqueous dispersion-type pressure-sensitive adhesive composition for an optical film that is suitable for use in optical films and is such that a pressure-sensitive adhesive layer made from the aqueous dispersion-type pressure-sensitive adhesive is prevented from peeling in a moist environment and also prevented from peeling over time after taken out of a high-temperature moist environment, transferred to a room temperature environment, and stored for a long time. Another object of the present invention is to provide a pressure-sensitive adhesive layer for an optical film made from such an aqueous dispersion-type pressure-sensitive adhesive composition for an optical film.

Another object of the present invention is to provide a pressure-sensitive adhesive optical film including an optical film and the pressure-sensitive adhesive layer for an optical film placed on at least one side of the optical film. A further object of the present invention is to provide an image display device including the pressure-sensitive adhesive optical film.

As a result of earnest studies to solve the above problems, the inventors have accomplished the present invention based on the finding that the aqueous dispersion-type pressure-sensitive adhesive composition for an optical film etc., described below can solve the problems.

The present invention relates to an aqueous dispersion-type pressure-sensitive adhesive composition for an optical film, comprising emulsion particles of a core-shell structure, wherein
the emulsion particles include: a (meth)acryl-based copolymer (A) containing an alkyl (meth)acrylate as a monomer unit and having a glass transition temperature of −55° C. to 0° C. (wherein the glass transition temperature is calculated based on monofunctional monomers for monomer units); and a (meth)acryl-based copolymer (B) containing an alkyl (meth)acrylate as a monomer unit and having a glass transition temperature of 0° C. to 180° C. (wherein the glass transition temperature is calculated based on monofunctional monomers for monomer units),
in a single emulsion particle, one of the (meth)acryl-based copolymers (A) and (B) forms a core layer, and another of the copolymers (A) and (B) forms a shell layer,
at least one of the (meth)acryl-based copolymers (A) and (B) contains a carboxyl group-containing monomer as a monomer unit,
a difference of the glass transition temperatures between the (meth)acryl-based copolymers (A) and (B) is 50° C. or more, and
a ratio (A)/(B) (by weight) of the (meth)acryl-based copolymers (A) and (B) is in the range of 50/50 to 90/10.

In the aqueous dispersion-type pressure-sensitive adhesive composition for an optical, it is preferable that the (meth)acryl-based copolymer (B) forms the core layer, and the (meth)acryl-based copolymer (A) forms the shell layer.

In the aqueous dispersion-type pressure-sensitive adhesive composition for an optical film, at least one of the (meth)acryl-based copolymers (A) and (B) preferably contains an alkoxysilyl group-containing monomer as a monomer unit (provided that the alkoxysilyl group-containing monomer is excluded from the monofunctional monomers for calculation of the glass transition temperature), and a content of the alkoxysilyl group-containing monomer is preferably 0.001 to 1% by weight of all monomer units in the (meth)acryl-based copolymer (A) or (B).

In the aqueous dispersion-type pressure-sensitive adhesive composition for an optical film, at least one of the (meth)acryl-based copolymers (A) and (B) preferably contains a phosphate group-containing monomer as a monomer unit. A content of the phosphate group-containing monomer is preferably 0.1 to 20% by weight of all monomer units in the (meth)acryl-based copolymer (A) or (B).

In the aqueous dispersion-type pressure-sensitive adhesive composition for an optical film, the emulsion particles of a core-shell structure may be obtained by a process comprising performing emulsion polymerization of monomers for monomer units of the copolymer for the core layer to form the copolymer for the core layer and then performing emulsion polymerization of monomers for monomer units of the copolymer for the shell layer to form the copolymer for the shell layer.

The present invention also related to a method of producing the aqueous dispersion-type pressure-sensitive adhesive composition for an optical film, including the steps of:

performing emulsion polymerization of monomers for monomer units of a copolymer for a core layer to form the copolymer for the core layer; and then performing emulsion polymerization of monomers for monomer units of a copolymer for a shell layer to form the copolymer for the shell layer, so that emulsion particles of a core-shell structure are produced in such a manner that a single emulsion particle includes the copolymer for the core layer and the copolymer for the shell layer, wherein one of the copolymers for the core layer and the shell layer is a (meth)acryl-based copolymer (A) containing an alkyl (meth)acrylate as a monomer unit and having a glass transition temperature of −55° C. to 0° C. (wherein the glass transition temperature is calculated based on monofunctional monomers for monomer units), another of the copolymers for the core layer and the shell layer is a (meth)acryl-based copolymer (B) containing an alkyl (meth)acrylate as a monomer unit and having a glass transition temperature of 0° C. to 180° C. (wherein the glass transition temperature is calculated based on monofunctional monomers for monomer units), at least one of the (meth)acryl-based copolymers (A) and (B) contains a carboxyl group-containing monomer as a monomer unit, a difference of the glass transition temperatures between the (meth)acryl-based copolymers (A) and (B) is 50° C. or more, and a ratio (A)/(B) (by weight) of the (meth)acryl-based copolymers (A) and (B) is in the range of 50/50 to 90/10.

The present invention also related to a pressure-sensitive adhesive layer for an optical film obtained by a process including applying the aqueous dispersion-type pressure-sensitive adhesive composition for an optical film and then drying the composition.

The pressure-sensitive adhesive layer for an optical film preferably has a haze (H20) of 0 to 1% when having a thickness of 20 μm. The pressure-sensitive adhesive layer for an optical film also preferably has a ratio of a haze (H200) to the haze (H20) of 2 or less, wherein the haze (H200) is a haze of the pressure-sensitive adhesive layer with a thickness of 200 μm.

The present invention also related to a pressure-sensitive adhesive optical film, including an optical film and the pressure-sensitive adhesive layer for an optical film placed on at least one side of the optical film.

The optical film may be a polarizing plate comprising a polarizer and a transparent protective film or films provided on one or both sides of the polarizer. The polarizer may have a thickness of 10 μm or less.

The present invention also related to an image display device including at least one piece of the pressure-sensitive adhesive optical film.

Effect of the Invention

The moisture durability of a pressure-sensitive adhesive optical film can be identified as whether peeling occurs after storage in a moist environment (for example, at 60° C. and 90% R.H.). Briefly speaking, such peeling occurs at the interface between the pressure-sensitive adhesive layer and the adherend (for example, glass) due to the insufficient adhesive strength of the pressure-sensitive adhesive layer to the adherend, which is caused by the storage of the pressure-sensitive adhesive optical film in a moist environment (hereinafter, this type of peeling is referred to as moisture-induced peeling).

On the other hand, it has been newly found that there is a problem in which peeling (peeling over time) also occurs after a pressure-sensitive adhesive optical film is taken out of a high-temperature moist environment (for example, at 85° C. and 85% R. H.), transferred to a room temperature environment, and stored for a long term. It has been found that peeling over time is caused by a mechanism different from that of moisture-induced peeling. Specifically, it has been found that peeling over time proceeds as follows: after an optical film expanded in a high-temperature moist environment and a pressure-sensitive adhesive layer expanded by following the expansion of the optical film are taken out of a high-temperature moist environment, transferred to a room temperature environment, and stored for a long term (allowed to stand for at least about 100 hours), the optical film is shrunk from the state before the expansion, so that the end portion of the optical film is warped in a direction (shrinking direction) opposite to the glass surface side and that tensile stress acts on the pressure-sensitive adhesive layer and the adherend due to the shrinkage and warpage of the optical film, which causes cohesion failure when the pressure-sensitive adhesive no longer withstands the tensile stress. Thus, the inventors have completed the present invention based on the new findings that the cause of the problem of peeling over time, which occurs after taking out of a high-temperature moist environment, transfer to a room temperature environment, and long-term storage, is not insufficient adhesion of a pressure-sensitive adhesive but insufficient cohesive strength of a pressure-sensitive adhesive layer.

As described above, the problem of peeling over time, which occurs after taking out of a moist environment, transfer to a room temperature environment, and long-term storage, is caused by insufficient cohesive strength of a pressure-sensitive adhesive layer. According to the present invention, therefore, the aqueous dispersion-type pressure-sensitive adhesive composition for forming a pressure-sensitive adhesive layer with a certain cohesive strength contains emulsion particles of a so-called core-shell structure in which a normal (meth)acryl-based copolymer (A) with a low glass transition temperature and a normal (meth)acryl-based copolymer (B) with a specific high glass transition temperature forms a core layer or a shell layer in a single emulsion particle. The pressure-sensitive adhesive layer made from the aqueous dispersion-type pressure-sensitive adhesive composition containing emulsion particles of a core-shell structure according to the present invention has high cohesive strength while maintaining an adhesive strength to an adherend, so that the moisture-induced peeling and the peeling over time can be suppressed.

As described above, when the core-shell structure emulsion particles containing the (meth)acryl-based copolymer (A) with a low glass transition temperature and the (meth)acryl-based copolymer (B) with a high glass transition temperature are used to form an aqueous dispersion-type pressure-sensitive adhesive, the (meth)acryl-based copolymer (A) with a low glass transition temperature can prevent moisture-induced peeling by assuring the adhesive strength of the pressure-sensitive adhesive layer, and the (meth)acryl-based copolymer (B) with a high glass transition temperature can prevent peeling over time by increasing the cohesive strength of the pressure-sensitive adhesive layer.

The (meth)acryl-based copolymer (B) with a high glass transition is not only effective in preventing peeling over time but also can suppress expansion of an optical film at an early stage when the pressure-sensitive adhesive optical film is stored in a moist environment, which is also preferred in order to suppress moisture-induced peeling.

In the aqueous dispersion-type pressure-sensitive adhesive composition of the present invention, emulsion particles of a core-shell structure contain the low-glass-transition-temperature (meth)acryl-based copolymer (A) and the high-glass-transition-temperature (meth)acryl-based copolymer (B) in a single emulsion particle. Therefore, it is conceivable that the (meth)acryl-based copolymers (A) and (B) are present, exhibiting their properties independently, so that moisture-induced peeling and peeling over time can be suppressed for moisture durability. Therefore, the advantageous effects of the present invention cannot be achieved using an aqueous dispersion of acryl-based polymers obtained by uniform polymerization of a mixture of monomers for forming the (meth)acryl-based copolymers (A) and (B) in place of core-shell structure emulsion particles of the (meth)acryl-based copolymers (A) and (B) according to the present invention.

BRIEF DESCRIPTION OF DRAWING

FIG. 1 is a 3D-TEM image showing emulsion particles of a core-shell structure in Example 6 according to the present invention.

MODE FOR CARRYING OUT THE INVENTION

The aqueous dispersion-type pressure-sensitive adhesive composition for an optical film of the present invention contains emulsion particles of a core-shell structure including a core layer and a shell layer, in which in a single emulsion particle, one of a (meth)acryl-based copolymer (A) with a glass transition temperature of −55° C. to 0° C. and a (meth)acryl-based copolymer (B) with a glass transition temperature of 0° C. to 180° C. forms the core layer, and the other copolymer forms the shell layer.

As stated above, the (meth)acryl-based copolymer (A) has a glass transition temperature of −55° C. to 0° C., and in this range, a reduction in cohesive strength can be prevented, while the tackiness of the pressure-sensitive adhesive is assured. The glass transition temperature is preferably −20° C. or less, more preferably −30° C. or less, even more preferably −35° C. or less, still more preferably −40° C. or less. If the (meth)acryl-based copolymer (A) has a glass transition temperature of more than 0° C., the pressure-sensitive adhesive can have reduced tackiness so that moisture-induced peeling can easily occur. On the other hand, the glass transition temperature is preferably −50° C. or more, and more preferably −45° C. or more (even more preferably more than −45° C.). If the (meth)acryl-based copolymer (A) has a glass transition temperature of less than −55° C., the pressure-sensitive adhesive can have reduced cohesive strength so that peeling over time can easily occur.

As stated above, the (meth)acryl-based copolymer (B) has a glass transition temperature of 0° C. to 180° C., and in this range, a reduction in cohesive strength can be prevented, while the tackiness of the pressure-sensitive adhesive is assured. The glass transition temperature is preferably 50° C. or more, more preferably 60° C. or more, even more preferably 70° C. or more, still more preferably 80° C. or more, and yet more preferably 85° C. or more. If the (meth)acryl-based copolymer (B) has a glass transition temperature of less than 50° C., the pressure-sensitive adhesive can have reduced tackiness so that peeling over time can easily occur. On the other hand, to prevent moisture-induced peeling, the glass transition temperature is preferably 110° C. or less, more preferably 100° C. or less, and even more preferably 90° C. or less (still more preferably less than 90° C.).

A difference of the glass transition temperatures between the (meth)acryl-based copolymers (A) and (B) is 50° C. or more. The difference of the glass transition temperatures is preferably 70° C. or more, more preferably 80° C. or more, even more preferably 90° C. or more, still more preferably 100° C. or more, yet more preferably 110° C. or more, even yet more preferably 120° C. or more so that a reduction in cohesive strength can be prevented while the tackiness of the pressure-sensitive adhesive is assured.

The glass transition temperatures of the (meth)acryl-based copolymers (A) and (B) are theoretical values each calculated from the FOX equation taking into account the types and contents of the monomer units of each polymer.

FOX equation: $1/Tg = w_1/Tg_1 + w_2/Tg_2 + \ldots + w_n/Tg_n$ ($Tg$: the glass transition temperature (K) of the polymer; $Tg_1, Tg_2, \ldots Tg_n$: the glass transition temperatures (K) of the homopolymers of the respective monomers; $w_1, w_2, \ldots w_n$: the weight fractions of the respective monomers)

It should be noted that the glass transition temperatures of the (meth)acryl-based copolymers (A) and (B) are calculated based on the monofunctional monomers. Namely, even when the polymers each contain a polyfunctional monomer as a monomer unit, the polyfunctional monomer is neglected in the calculation of the glass transition temperature, because the polyfunctional monomer is used in a small amount so that its influence on the glass transition temperature of the copolymer is low. It should also be noted that an alkoxysilyl group-containing monomer is recognized as a polyfunctional monomer and therefore neglected in the calculation of the glass transition temperatures. The theoretical glass transition temperatures calculated from the FOX equation well agree with actual glass transition temperatures determined from differential scanning calorimetry (DSC), dynamic viscoelasticity, etc.

In the (meth)acryl-based copolymers (A) and (B), the monomer unit type and the component composition are not restricted as long as they contain an alkyl (meth)acrylate as a monomer unit and satisfy the requirements for the glass transition temperatures. The term "alkyl (meth)acrylate" refers to alkyl acrylate and/or alkyl methacrylate, and "(meth)" is used in the same meaning in the description.

In view of emulsion polymerization reactivity, the alkyl (meth)acrylate used to form the (meth)acryl-based copolymer (A) preferably has a water solubility in a specific range, and an alkyl acrylate having an alkyl group of 1 to 18 carbon atoms is preferably used to form a major component, so that the glass transition temperature can be easily controlled. Examples of the alkyl (meth)acrylate include methyl (meth)acrylate, ethyl (meth)acrylate, propyl (meth)acrylate, n-butyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, lauryl (meth)acrylate, tridecyl (meth)acrylate, stearyl (meth)acrylate, and other alkyl esters of (meth)acrylic acid. These may be used alone or in combination of two or more. Among these, an alkyl (meth)acrylate having an alkyl group of 3 to 9 carbon atoms is preferable, such as propyl (meth)acrylate, n-butyl (meth)acrylate, 2-ethylhexyl (meth)acrylate, or n-octyl (meth)acrylate. The content of the alkyl (meth)acrylate(s) in all monomer units is preferably from 60 to 99.9% by weight, more preferably from 70 to 99.9% by weight, even more preferably from 80 to 99.9% by weight, still more preferably from 80 to 99% by weight, and yet more preferably from 80 to 95% by weight.

In view of emulsion polymerization reactivity, the (meth)acryl-based copolymer (A) preferably has a water solubility in a specific range, and an alkyl methacrylate having an alkyl group of 1 to 18 carbon atoms may be used, so that the glass transition temperature can be easily controlled. Examples of the alkyl methacrylate include methyl methacrylate, ethyl methacrylate, propyl methacrylate, n-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, and other alkyl esters of methacrylic acid. These may be used alone or in combination of two or more. Among these, methyl methacrylate, ethyl methacrylate, and cyclohexyl methacrylate are preferred. The content of the alkyl methacrylate (s) in all monomer units is preferably from 39.9% by weight or less, more preferably 30% by weight or less, even more preferably 20% by weight or less, still more preferably 15% by weight or less, and yet more preferably 10% by weight or less.

On the other hand, in view of emulsion polymerization reactivity, the alkyl (meth)acrylate used to form the (meth)acryl-based copolymer (B) preferably has a water solubility in a specific range, and an alkyl methacrylate having an alkyl group of 1 to 18 carbon atoms is preferably used to form a major component, so that the glass transition temperature can be easily controlled. The alkyl methacrylates may be used alone or in combination of two or more. Examples of the alkyl methacrylate may include those listed above. Among those listed above, methyl methacrylate, ethyl methacrylate, tert-butyl methacrylate, and isobornyl methacrylate are preferred. The content of the alkyl methacrylate (s) in all monomer units is preferably from 60 to 99.9% by weight, more preferably from 70 to 99.9% by weight, even more preferably from 80 to 99.9% by weight, still more preferably from 80 to 99% by weight, and yet more preferably from 80 to 95% by weight.

In view of emulsion polymerization reactivity, the (meth)acryl-based copolymer (B) preferably has a water solubility in a specific range, and an alkyl acrylate having an alkyl group of 1 to 18 carbon atoms may be used, so that the glass transition temperature can be easily controlled. The alkyl acrylates may be used alone or in combination of two or more. Examples of the alkyl acrylate may include those listed above. Among those listed above, alkyl acrylates having an alkyl group of 3 to 9 carbon atoms are preferred, such as propyl acrylate, n-butyl acrylate, 2-ethylhexyl acrylate, and n-octyl acrylate. The content of the alkyl acrylate(s) in all monomer units is preferably 39.9% by weight or less, more preferably from 5 to 30% by weight, even more preferably from 5 to 20% by weight.

To improve the tackiness of the pressure-sensitive adhesive and provide stability for the emulsion, a carboxyl group-containing monomer is used to form at least one of the (meth)acryl-based copolymers (A) and (B). The carboxyl group-containing monomer may be monomer having a carboxyl group and a radically-polymerizable unsaturated double bond-containing group such as a (meth)acryloyl group or a vinyl group, examples of which include (meth)acrylic acid, itaconic acid, maleic acid, fumaric acid, crotonic acid, carboxyethyl acrylate, and carboxypentyl acrylate. While the carboxyl group-containing monomer may be included in at least one of the (meth)acryl-based polymer (A) and (B), or either in the (meth)acryl-based polymer (A) or (B) as a monomer unit, it is preferred that both of them contain the carboxyl group-containing monomer. The content of the carboxyl group-containing monomer in all monomer units of the (meth)acryl-based polymer (A) or (B) is preferably from 0.1 to 10% by weight, more preferably from 0.5 to 7% by weight, and even more preferably from 1 to 5% by weight.

In addition to the alkyl (meth)acrylate and the carboxyl group-containing monomer, at least one copolymerizable monomer having an unsaturated double bond-containing polymerizable group such as a (meth)acryloyl group or a vinyl group may be introduced into the (meth)acryl-based polymer (A) or (B) by copolymerization in order to stabilize water dispersibility, to improve adhesion to a base material such as an optical film for the pressure-sensitive adhesive layer, and to improve initial tackiness to the adherend.

An alkoxysilyl group-containing monomer is mentioned as the copolymerizable monomer. The alkoxysilyl group-containing monomer may be a silane coupling agent-type unsaturated monomer having an alkoxysilyl group and a group having at least one unsaturated double bond, such as a (meth)acryloyl group or a vinyl group. The alkoxysilyl group-containing monomer is preferred in order to allow the (meth)acryl-based copolymers (A) and (B) to have a cross-linked structure and improved adhesion to glass.

Examples of the alkoxysilyl group-containing monomer include an alkoxysilyl group-containing (meth)acrylate monomer and an alkoxysilyl group-containing vinyl monomer. Examples of the alkoxysilyl group-containing (meth)acrylate monomer include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilanes such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane, and 3-(meth)acryloyloxypropyl-propyldiethoxysilane; and (meth)acryloyloxyalkyl-dialkyl(mono)alkoxysilanes corresponding to these monomers. For example, alkoxysilyl group-containing vinyl monomers include vinyltrialkoxysilanes such as vinyltrimethoxysilane, vinyltriethoxysilane, vinyltripropoxysilane, vinyltriisopropoxysilane, and vinyltributoxysilane, and vinylalkyldialkoxysilanes and vinyldialkylalkoxysilanes corresponding thereto; vinylalkyltrialkoxysilanes such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane, and (vinylalkyl)alkyldialkoxysilanes and (vinylalkyl)dialkyl(mono)alkoxysilanes corresponding thereto.

The alkoxysilyl group-containing monomer may be included in at least one of the (meth)acryl-based polymer (A) and (B), or either in the (meth)acryl-based polymer (A) or (B). The content of the alkoxysilyl group-containing monomer in all monomer units of the (meth)acryl-based polymer (A) or (B) is preferably from 0.001 to 1% by weight, more preferably from 0.01 to 0.5% by weight, and even more preferably from 0.03 to 0.1% by weight. If it is less than 0.001% by weight, the effect of using the alkoxysilyl group-containing monomer (providing a crosslinked structure and adhesion to glass) may be insufficiently obtained. If it is more than 1% by weight, the pressure-sensitive adhesive layer may have a too high degree of crosslinkage, so that the pressure-sensitive adhesive layer may crack over time.

The copolymerizable monomer may be a phosphate group-containing monomer. The phosphate group-containing monomer is effective in improving adhesion to glass.

For example, the phosphate group-containing monomer may be a phosphate group-containing monomer represented by formula (1) below or a salt thereof.

[Formula (1)]

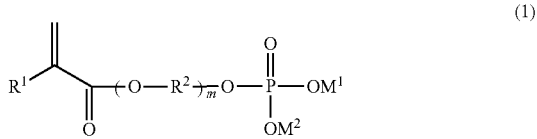

(1)

In formula (1), $R^1$ represents a hydrogen atom or a methyl group, $R^2$ represents an alkylene group of 1 to 4 carbon atoms, m represents an integer of 2 or more, and $M^1$ and $M^2$ each independently represent a hydrogen atom or a cation.

In formula (1), m is 2 or more, preferably 4 or more, generally 40 or less, and m represents the degree of polymerization of the oxyalkylene groups. The polyoxyalkylene group may be a polyoxyethylene group or a polyoxypropylene group, and these polyoxyalkylene groups may comprise random, block, or graft units. The cation of the salt of the phosphate group is typically, but not limited to, an inorganic cation such as an alkali metal such as sodium or potassium or an alkaline-earth metal such as calcium or magnesium, or an organic cation such as a quaternary amine.

The phosphate group-containing monomer may be included in at least one of the (meth)acryl-based polymer (A) and (B), or either in the (meth)acryl-based polymer (A) or (B). The content of the phosphate group-containing monomer in all monomer units of the (meth)acryl-based polymer (A) or (B) is preferably from 0.1 to 20% by weight. If it is less than 0.1% by weight, the effect of using the phosphate group-containing monomer (suppression of the formation of linear bubbles) may be insufficiently obtained, while a content of more than 20% by weight is not preferable in view of polymerization stability or pressure-sensitive adhesive properties.

Examples of copolymerizable monomers other than the alkoxysilyl group-containing monomer and the phosphate group-containing monomer include acid anhydride group-containing monomers such as maleic anhydride and itaconic anhydride; aryl (meth)acrylate such as phenyl (meth)acrylate; vinyl esters such as vinyl acetate and vinyl propionate; styrene monomers such as styrene; epoxy group-containing monomers such as glycidyl (meth)acrylate and methylglycidyl (meth)acrylate; hydroxyl group-containing monomers such as 2-hydroxyethyl (meth)acrylate and 2-hydroxypropyl (meth)acrylate; nitrogen atom-containing monomers such as (meth)acrylamide, N,N-dimethyl(meth)acrylamide, N,N-diethyl(meth)acrylamide, N-isopropyl(meth)acrylamide, N-butyl(meth)acrylamide, N-methylol(meth)acrylamide, N-methylolpropane(meth)acrylamide, (meth)acryloylmorpholine, aminoethyl (meth)acrylate, N,N-dimethylaminoethyl (meth)acrylate, and tert-butylaminoethyl (meth)acrylate; alkoxy group-containing monomers such as methoxyethyl (meth)acrylate and ethoxyethyl (meth)acrylate; cyano group-containing monomers such as acrylonitrile and methacrylonitrile; functional monomers such as 2-methacryloyloxyethyl isocyanate; olefin monomers such as ethylene, propylene, isoprene, butadiene, and isobutylene; vinyl ether monomers such as vinyl ether; halogen atom-containing monomers such as vinyl chloride; and other monomers including vinyl group-containing heterocyclic compounds such as N-vinylpyrrolidone, N-(1-methylvinyl)pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, and N-vinylmorpholine, and N-vinylcarboxylic acid amides.

Examples of the copolymerizable monomer also include maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid.

Examples of the copolymerizable monomer also include glycol acrylate monomers such as polyethylene glycol (meth)acrylate, polypropylene glycol (meth)acrylate, methoxyethylene glycol (meth)acrylate, and methoxypolypropylene glycol (meth)acrylate; and other monomers such as acrylic ester monomers containing a heterocyclic ring or a halogen atom, such as tetrahydrofurfuryl (meth)acrylate and fluoro(meth)acrylate.

A polyfunctional monomer, other than the above alkoxysilyl group-containing monomer, may also be used as the copolymerizable monomer for a purpose such as control of the gel fraction of the aqueous dispersion pressure-sensitive adhesive. The polyfunctional monomer may be a compound having two or more unsaturated double bonds such as those in (meth)acryloyl groups or vinyl groups. Examples that may also be used include (meth)acrylate esters of polyhydric alcohols, such as (mono or poly)alkylene glycol di(meth)acrylates including (mono or polyethylene glycol di(meth)acrylates such as ethylene glycol di(meth)acrylate, diethylene glycol di(meth)acrylate, triethylene glycol di(meth)acrylate, trimethylolpropane tri(meth)acrylate, and tetraethylene glycol di(meth)acrylate, (mono or poly)propylene glycol di(meth)acrylate such as propylene glycol di(meth)acrylate, neopentyl glycol di(meth)acrylate, 1,6-hexanediol di(meth)acrylate, pentaerythritol di(meth)acrylate, trimethylolpropane tri(meth)acrylate, pentaerythritol tri(meth)acrylate, and dipentaerythritol hexa(meth)acrylate; polyfunctional vinyl compounds such as divinylbenzene; and compounds having two or more reactive unsaturated double bonds which have different reactivity respectively, such as allyl (meth)acrylate and vinyl (meth)acrylate. The polyfunctional monomer may also be a compound having a polyester, epoxy or urethane skeleton to which two or more unsaturated double bonds are added in the form of functional groups such as (meth)acryloyl groups or vinyl groups in the same manner as the monomer component, such as polyester (meth)acrylate, epoxy (meth)acrylate, or urethane (meth) acrylate.

The copolymerizable monomer other than the alkoxysilyl group-containing monomer and the phosphate group-containing monomer may be included in at least one of the (meth)acryl-based polymer (A) and (B), or either in the (meth)acryl-based polymer (A) or (B). When a monofunctional monomer is used as the copolymerizable monomer other than the alkoxysilyl group-containing monomer and the phosphate group-containing monomer, the content of the copolymerizable monomer in all monomer units of the (meth)acryl-based polymer (A) or (B) is preferably 20% by weight or less, more preferably 10% by weight or less, and even more preferably 5% by weight or less in view of the stability of the aqueous dispersion and prevention of an excessive increase in the viscosity of the aqueous dispersion. When a polyfunctional monomer is used as the copolymerizable monomer, the content of the copolymerizable monomer in all monomer units of the (meth)acryl-based polymer is preferably 5% by weight or less, more preferably 3% by weight or less, and even more preferably 1% by weight or less in view of the stability of the aqueous dispersion.

In the present invention, the emulsion particles of a core-shell structure contain the (meth)acryl-based copolymers (A) and (B) in such a manner that in a single emulsion particle, one of the copolymers forms a core layer, and the other forms a shell layer. Thus, there are (1) a case where the (meth)acryl-based copolymer (A) forms a core layer, and the (meth)acryl-based copolymer (B) forms a shell layer, and (2) a case where the (meth)acryl-based copolymer (B) forms a core layer, and the (meth)acryl-based copolymer (A) forms a shell layer. While the structure in any of the cases (1) and (2) may be used to form the emulsion particles of a core-shell structure according to the present invention, the structure in the case (2) is preferred to effectively suppress peeling over time.

In the present invention, the emulsion particles of a core-shell structure contain the (meth)acryl-based copolymers (A) and (B) in such a manner that a single emulsion particle contains the copolymers (A) and (B) in a (A)/(B) ratio (weight ratio) in the range of 50/50 to 90/10. When the ratio is calculated, the total amount of the (meth)acryl-based copolymers (A) and (B) is normalized as 100 (% by weight). When the (meth)acryl-based copolymers (A) and (B) are present in this range, a reduction in cohesive strength can be prevented while the tackiness of the pressure-sensitive adhesive is assured. In other words, the particle contains 50 to 90% by weight of the (meth)acryl-based copolymer (A), which forms a core or shell layer, and 10 to 50% by weight of the (meth)acryl-based copolymer (B), which forms a shell or core layer, in such a manner that the total content of the copolymers is 100% by weight. The content of the (meth) acryl-based copolymer (A) is preferably 60% by weight or more, and more preferably 70% by weight or more. If the content of the (meth)acryl-based copolymer (A) is less than 50% by weight, the tackiness of the pressure-sensitive adhesive can decrease so that moisture-induced peeling can easily occur. On the other hand, the (meth)acryl-based copolymer (A) is preferably used at a content of 90% by weight or less, more preferably 85% by weight or less, even more preferably less than 85% by weight. When the content of the (meth)acryl-based copolymer (A) is less than 85% by weight, a satisfactory effect can be obtained even in the absence of other monomer units than the alkyl (meth) acrylate monomer unit and the carboxyl group-containing monomer unit. If the content of the (meth)acryl-based copolymer (A) is more than 90% by weight, the cohesive strength of the pressure-sensitive adhesive can decrease so that peeling can easily occur over time.

The emulsion particles of a core-shell structure according to the present invention can be obtained by a multi-stage emulsion polymerization process that includes forming a copolymer for a core layer by emulsion polymerization and then forming another copolymer for a shell layer by emulsion polymerization in the presence of the copolymer for a core layer. Specifically, in each emulsion polymerization, monomers, which include an alkyl (meth)acrylate, for the monomer units of the copolymer for the core or shell layer are polymerized in water in the presence of a surfactant (emulsifying agent) and a radical polymerization initiator, so that the copolymer for the core or shell layer is formed.

The emulsion polymerization of the monomer components may be performed by a conventional method. In the emulsion polymerization, for example, the monomer components, a surfactant (an emulsifying agent), and a radical polymerization initiator, and optionally a chain transfer agent or the like are mixed as appropriate. In the each emulsion polymerization, more specifically, for example, a known emulsion polymerization method may be employed, such as a batch mixing method (batch polymerization method), a monomer dropping method, or a monomer emulsion dropping method. In the monomer dropping method, continuous dropping or divided dropping is appropriately selected. These methods may be appropriately combined. While reaction conditions and so on may be appropriately selected, for example, the polymerization temperature is preferably from about 40 to about 95° C., and the polymerization time is preferably from about 30 minutes to about 24 hours.

The surfactant (emulsifying agent) for use in the emulsion polymerization may be, but not limited to, any of various surfactants commonly used in emulsion polymerization. As the surfactant, an anionic or a nonionic surfactant is generally used. Examples of the anionic surfactant include higher fatty acid salts such as sodium oleate; alkylarylsulfonate salts such as sodium dodecylbenzenesulfonate; alkylsulfate ester salts such as sodium laurylsulfate and ammonium laurylsulfate; polyoxyethylene alkyl ether sulfate ester salts such as sodium polyoxyethylene lauryl ether sulfate; polyoxyethylene alkyl aryl ether sulfate ester salts such as sodium polyoxyethylene nonyl phenyl ether sulfate; alkyl sulfosuccinic acid ester salts such as sodium monooctyl sulfosuccinate, sodium dioctyl sulfosuccinate, and sodium polyoxyethylene lauryl sulfosuccinate, and derivatives thereof; and polyoxyethylene distyrenated phenyl ether sulfate ester salts. Examples of the nonionic surfactant include polyoxyethylene alkyl ethers such as polyoxyethylene lauryl ether and polyoxyethylene stearyl ether; polyoxyethylene alkyl phenyl ethers such as polyoxyethylene octyl phenyl ether and polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monostearate; glycerin higher fatty acid esters such as oleic acid monoglyceride and stearic acid monoglyceride; and polyoxyethylene-polyoxypropylene block copolymers, and polyoxyethylene distyrenated phenyl ether.

Besides the above non-reactive surfactants, a reactive surfactant having a radical-polymerizable functional group containing an ethylenic unsaturated double bond may be used as the surfactant. The reactive surfactant may be a radical-polymerizable surfactant prepared by introducing a radical-polymerizable functional group (radically reactive group) such as a propenyl group or an allyl ether group into the anionic surfactant or the nonionic surfactant. These surfactants may be appropriately used alone or in any combination. Among these surfactants, the radical-polymerizable surfactant having a radical-polymerizable functional group is preferably used in view of the stability of the aqueous dispersion or the durability of the pressure-sensitive adhesive layer.

Examples of anionic reactive surfactants include alkyl ether surfactants (examples of commercially available products include AQUALON KH-05, KH-10, and KH-20 manufactured by Dai-ichi Kogyo Seiyaku Co., Ltd., ADEKA REASOAP SR-10N and SR-20N manufactured by ADEKA CORPORATION, LATEMUL PD-104 manufactured by Kao Corporation, and others); sulfosuccinic acid ester surfactants (examples of commercially available products include LATEMUL S-120, S-120A, S-180P, and S-180A manufactured by Kao Corporation and ELEMINOL JS-2 manufactured by Sanyo Chemical Industries, Ltd., and others); alkyl phenyl ether surfactants or alkyl phenyl ester surfactants (examples of commercially available products include AQUALON H-2855A, H-3855B, H-3855C, H-3856, HS-05, HS-10, HS-20, HS-30, BC-05, BC-10, and BC-20 manufactured by Dai-ichi Kogyo Seiyaku Co., Ltd., and ADEKA REASOAP SDX-222, SDX-223, SDX-232, SDX-233, SDX-259, SE-10N, and SE-20N manufactured by ADEKA CORPORATION); (meth)acrylate sulfate ester surfactants (examples of commercially available products include ANTOX MS-60 and MS-2N manufactured by Nippon Nyukazai Co., Ltd., ELEMINOL RS-30 manufactured by Sanyo Chemical Industries Co., Ltd., and others); and phosphoric acid ester surfactants (examples of commercially available products include H-3330PL manufactured by Dai-ichi Kogyo Seiyaku Co., Ltd. ADEKA REASOAP PP-70 manufactured by ADEKA CORPORATION, and others). Examples of nonionic reactive surfactants include alkyl ether surfactants (examples of commercially available products include ADEKA REASOAP ER-10, ER-20, ER-30, and ER-40 manufactured by ADEKA CORPORATION, LATEMUL PD-420, PD-430, and PD-450 manufactured by Kao Corporation, and others); alkyl phenyl ether surfactants or alkyl phenyl ester surfactants (examples of commercially available products include AQUALON RN-10, RN-20, RN-30, and RN-50 manufactured by Dai-ichi Kogyo Seiyaku Co., Ltd., ADEKA REASOAP NE-10, NE-20, NE-30, and NE-40 manufactured by ADEKA CORPORATION, and others); and (meth)acrylate sulfate ester surfactants (examples of commercially available products include RMA-564, RMA-568, and RMA-1114 manufactured by Nippon Nyukazai Co., Ltd, and others).

The content of the surfactant is preferably from 0.3 to 5 parts by weight based on 100 parts by weight of the monomer components including the alkyl (meth)acrylate. Pressure-sensitive adhesive properties, polymerization stability, mechanical stability, etc. can be improved by controlling the content of the surfactant. The surfactant content is more preferably from 0.3 to 3 parts by weight.

The radical polymerization initiator may be, but not limited to, any known radical polymerization initiator commonly used in emulsion polymerization. Examples include azo initiators such as 2,2'-azobisisobutylonitrile, 2,2'-azobis(2-methylpropionamidine)disulfate, 2,2'-azobis(2-methylpropionamidine)dihydrochloride, 2,2'-azobis(2-amidinopropane)dihydrochloride, and 2,2'-azobis[2-(2-imidazoline-2-yl)propane]dihydrochloride; persulfate initiators such as potassium persulfate and ammonium persulfate; peroxide initiators such as benzoyl peroxide, tert-butyl hydroperoxide, and hydrogen peroxide; substituted ethane initiators such as phenyl-substituted ethane; and carbonyl initiators such as aromatic carbonyl compounds. These polymerization initiators may be appropriately used alone or in any combination. If desired, the emulsion polymerization may be performed using a redox system initiator, in which a reducing agent is used in combination with the polymerization initiator. This makes it easy to accelerate the emulsion polymerization rate or to perform the emulsion polymerization at low temperature. Examples of such a reducing agent include reducing organic compounds such as ascorbic acid, erythorbic acid, tartaric acid, citric acid, glucose, and metal salts of formaldehyde sulfoxylate or the like; reducing inorganic compounds such as sodium thiosulfate, sodium sulfite, sodium bisulfite, and sodium metabisulfite; and ferrous chloride, Rongalite, and thiourea dioxide.

The content of the radical polymerization initiator is typically from about 0.02 to about 1 part by weight, preferably from 0.02 to 0.5 parts by weight, more preferably from 0.08 to 0.3 parts by weight, based on 100 parts by weight of the monomer components, while it is appropriately selected. If it is less than 0.02 parts by weight, the radical polymerization initiator may be less effective. If it is more than 1 part by weight, the (meth)acryl-based polymer (A) or (B) in the aqueous dispersion (polymer emulsion) may have a reduced molecular weight, so that the aqueous dispersion pressure-sensitive adhesive may have reduced durability. In the case of a redox system initiator, the reducing agent is preferably used in an amount of 0.01 to 1 part by weight based on 100 parts by weight of the total amount of the monomer components.

A chain transfer agent is optionally used to control the molecular weight of the (meth)acryl-based polymer. In general, chain transfer agents commonly used in emulsion polymerization are used. Examples include 1-dodecanthiol, mercaptoacetic acid, 2-mercaptoethanol, 2-ethylhexyl thioglycolate, 2,3-dimercapto-1-propanol, mercaptopropionic acid esters, and other mercaptans. These chain transfer agents may be appropriately used alone or in any combination. For example, the content of the chain transfer agent is from 0.001 to 0.3 parts by weight based on 100 parts by weight of the monomer components.

Such emulsion polymerization makes it possible to prepare the (meth)acryl-based copolymer (A) or (B) in the form of an aqueous dispersion (emulsion). The average particle size of such an aqueous dispersion-type (meth)acryl-based copolymer (A) or (B) is typically adjusted to 0.05 μm to 3 μm, and preferably to 0.05 μm to 1 μm. If the average particle size is less than 0.05 μm, the viscosity of the aqueous dispersion-type pressure-sensitive adhesive can increase in some cases, and if it is more than 1 μm, adhesiveness between particles can decrease so that cohesive strength can decrease in some cases.

For maintaining the stability of the aqueous dispersion, the carboxyl group-containing monomer or the like, which is included in at least one of the (meth)acryl-based polymer (A) and (B) that is contained in the aqueous dispersion as a monomer unit, should preferably be neutralized. For example, the neutralization can be performed using ammonia, an alkali metal hydroxide, or the like.

In general, the aqueous dispersion (meth)acryl-based polymer (A) or (B) according to the present invention preferably has a weight average molecular weight of 1,000,000 or more. In particular, the weight average molecular weight is preferably from 1,000,000 to 4,000,000 in view of heat resistance or moisture resistance. A weight average molecular weight of less than 1,000,000 is not preferred, because with such a molecular weight, heat resistance or moisture resistance may decrease. The pressure-sensitive adhesive obtained by the emulsion polymerization is preferred because the polymerization mechanism can produce very high molecular weight. It should be noted, however, that the pressure-sensitive adhesive obtained by the emulsion polymerization generally has a high gel content and cannot be subjected to GPC (gel permeation chromatography) measurement, which means that it is often difficult to identify the molecular weight by actual measurement.

The aqueous dispersion-type pressure-sensitive adhesive composition of the present invention contains, as a main component, emulsion particles of a core-shell structure. Although the aqueous dispersion-type pressure-sensitive adhesive composition of the present invention contains, as a main component, emulsion particles of a core-shell structure, an emulsion of the (meth)acryl-based copolymer (A) and an emulsion of the (meth)acryl-based copolymer (B), which are not involved in forming the core-shell structure, can be produced in the process of preparing the emulsion particles of a core-shell structure. Therefore, the aqueous dispersion-type pressure-sensitive adhesive composition of the present invention may also contain an emulsion of the (meth)acryl-based copolymer (A) and an emulsion of the (meth)acryl-based copolymer (B) in addition to the emulsion particles of a core-shell structure.

The aqueous dispersion-type pressure-sensitive adhesive composition of the present invention may also contain an additional component other than the emulsion particles of a core-shell structure, emulsion particles of the (meth)acryl-based copolymer (A), and emulsion particles of the (meth)acryl-based copolymer (B). Such an additional component is preferably used at a content of 10% by weight or less in order to suppress an adverse change in the haze of the pressure-sensitive adhesive layer.

If necessary, the composition may contain a crosslinking agent as the additional component in addition to the aqueous dispersion of the (meth)acryl-based copolymer (A) and the aqueous dispersion of the (meth)acryl-based copolymer (B). When the aqueous dispersion-type pressure-sensitive adhesive is an aqueous dispersion-type acryl-based pressure-sensitive adhesive, examples of the crosslinking agent that may be used include those commonly used, such as an isocyanate crosslinking agent, an epoxy crosslinking agent, an oxazoline crosslinking agent, an aziridine crosslinking agent, a carbodiimide crosslinking agent, and a metal chelate crosslinking agent. When a functional group-containing monomer is used, these crosslinking agents have the effect of reacting with the functional group incorporated in the (meth)acryl-based polymer to form crosslinkage.

The content of the crosslinking agent (on solid basis) is generally, but not limited to, about 10 parts by weight or less based on 100 parts by weight of the total solids in the aqueous dispersion of the (meth)acryl-based copolymer (A) and the aqueous dispersion of the (meth)acryl-based copolymer (B). The content of the crosslinking agent is preferably from about 0.001 to about 10 parts by weight, more preferably from about 0.01 to about 5 parts by weight, and even more preferably from about 0.01 to about 2 parts by weight. Although the crosslinking agent can provide a cohesive strength for the pressure-sensitive adhesive layer, the use of the crosslinking agent tends to degrade adhesion and to cause moisture-induced peeling. In the present invention, therefore, the crosslinking agent is not particularly necessary.

If necessary, the aqueous dispersion pressure-sensitive adhesive of the present invention may further appropriately contain any of various additives such as viscosity adjusting agent, releasing adjusting agent, tackifiers, plasticizers, softener, fillers including glass fibers, glass beads, metal power, or any other inorganic powder, pigments, colorants (pigments, dyes or the likes), pH adjusting agent (acid or base), antioxidants, and ultraviolet ray absorbing agents, silane coupling agents, without departing from the objects of the present invention. The aqueous dispersion pressure-sensitive adhesive may also contain fine particles to form a light-diffusing pressure-sensitive adhesive layer. These additives may also be added in the form of emulsion.

The pressure-sensitive adhesive layer for an optical film of the present invention is made from the aqueous dispersion-type pressure-sensitive adhesive composition. The pressure-sensitive adhesive layer can be formed by a process including applying the aqueous dispersion-type pressure-sensitive adhesive to a substrate (an optical film or a release film) and then drying the adhesive.

The pressure-sensitive adhesive optical film of the present invention includes an optical film and the pressure-sensitive adhesive layer or layers placed on one or both sides of the optical film. The pressure-sensitive adhesive optical film of the present invention can be formed by a process including applying the aqueous dispersion-type pressure-sensitive adhesive composition to an optical film or a release film and drying the composition. When the pressure-sensitive adhesive layer is formed on a release film, the pressure-sensitive adhesive layer will be transferred and bonded to an optical film.

Various methods may be used in the applying step of the aqueous dispersion-type pressure-sensitive adhesive composition. Examples include roll coating, kiss roll coating, gravure coating, reverse coating, roll brush coating, spray coating, dip roll coating, bar coating, knife coating, air knife coating, curtain coating, lip coating, and extrusion coating using a die coater or the like.

In the applying step, the amount of the application should be controlled so that a pressure-sensitive adhesive layer with a predetermined thickness (post-drying thickness) can be formed. The thickness (post-drying thickness) of the pressure-sensitive adhesive layer is generally set within the range of about 1 μm to about 100 μm, preferably within the range of 5 μm to 50 μm, and more preferably within the range of 10 μm to 40 μm.

Subsequently, the applied aqueous dispersion-type pressure-sensitive adhesive is dried to form a pressure-sensitive adhesive layer. The drying temperature is generally from about 80 to about 170° C., preferably from 80 to 160° C., and the drying time period is generally from about 0.5 to about 30 minutes, preferably from 1 to 10 minutes.

When having a thickness of 20 μm, the pressure-sensitive adhesive layer preferably has a haze (H20) of 0 to 1%, which can satisfy the transparency required of pressure-sensitive adhesive optical films. The haze (H20) is preferably from 0 to 0.8%, and more preferably from 0 to 0.5%.

It is preferred that the ratio (H200)/(H20) of the haze (H200) of the pressure-sensitive adhesive layer with a thickness of 200 μm to the haze (H20) should be 2 or less, so that the transparency required of pressure-sensitive adhesive optical films can be provided. The ratio (H200)/(H20) is preferably 1.5 or less.

Examples of the material used to form the release film include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Any plastic film capable of protecting the pressure-sensitive adhesive layer may be used, examples of which include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release film is generally from about 5 to about 200 μm, preferably from about 5 to about 100 μm. If necessary, the separator may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the release film is appropriately subjected to a release treatment such as a silicone treatment, a long-chain alkyl treatment, or a fluorine treatment, the releasability from the pressure-sensitive adhesive layer can be further increased.

The pressure-sensitive adhesive layer may be exposed. In such a case, the pressure-sensitive adhesive layer may be protected by the release film until it is actually used. The release film may be used as is as a separator for a pressure-sensitive adhesive optical film, so that the process can be simplified.

An optical film may also be coated with an anchor layer or subjected to any adhesion-facilitating treatment such as a corona treatment or a plasma treatment so as to have improved adhesion to a pressure-sensitive adhesive layer, and then the pressure-sensitive adhesive layer may be formed. The surface of the pressure-sensitive adhesive layer may also be subjected to an adhesion-facilitating treatment.

Materials that may be used to form the anchor layer preferably include an anchoring agent selected from polyurethane, polyester, polymers containing an amino group in the molecule, and polymers containing an oxazolinyl group in the molecule, in particular, preferably polymers containing an amino group in the molecule and polymers containing an oxazolinyl group in the molecule. Polymers containing an amino group in the molecule and polymers containing an oxazolinyl group in the molecule allow the amino group in the molecule or an oxazolinyl group in the molecule to react with a carboxyl group or the like in the pressure-sensitive adhesive or to make an interaction such as an ionic interaction, so that good adhesion can be ensured.

Examples of polymers containing an amino group in the molecule include polyethyleneimine, polyallylamine, polyvinylamine, polyvinylpyridine, polyvinylpyrrolidine, and a polymer of an amino group-containing monomer such as dimethylaminoethyl acrylate.

The optical film is, but not limited to the kinds, used for forming image display device such as liquid crystal display. A polarizing plate is exemplified. A polarizing plate including a polarizer and a transparent protective film provided on one side or both sides of the polarizer is generally used.

A polarizer is, but not limited to, various kinds of polarizer may be used. As a polarizer, for example, a film that is uniaxially stretched after having dichromatic substances, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Thickness of polarizer is, but not limited to, generally about 5 to about 80 μm.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thin polarizer with a thickness of 10 μm or less may also be used. In view of thinning, the thickness is preferably from 1 to 7 μm. Such a thin polarizer is less uneven in thickness, has good visibility, and is less dimensionally-variable and therefore has high durability. It is also preferred because it can form a thinner polarizing film.

Typical examples of such a thin polarizer include the thin polarizing layers disclosed in JP-A No. 51-069644, JP-A No. 2000-338329, WO2010/100917, specification of PCT/JP2010/001460, specification of Japanese Patent Application No. 2010-269002, or specification of Japanese Patent Application No. 2010-263692. These thin polarizing layers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage, which would otherwise be caused by stretching of the layer supported on a stretchable resin substrate.

Among processes including the steps of stretching and dyeing a laminate, a process capable of high-ratio stretching to improve polarizing performance is preferably used to obtain the thin polarizing layer. Therefore, the thin polarizing layer is preferably obtained by a process including the step of stretching in an aqueous boric acid solution as disclosed in WO2010/100917, the specification of PCT/

JP2010/001460, the specification of Japanese Patent Application No. 2010-269002, or the specification of Japanese Patent Application No. 2010-263692, in particular, preferably obtained by a process including the step of performing auxiliary in-air stretching before stretching in an aqueous boric acid solution as disclosed in the specification of Japanese Patent Application No. 2010-269002 or the specification of Japanese Patent Application or 2010-263692.

The specification of PCT/JP2010/001460 discloses a thin highly-functional polarizing layer that is formed integrally with a resin substrate, made of a PVA-based resin containing an oriented dichroic material, and has a thickness of 7 µm or less and the optical properties of a single transmittance of 42.0% or more and a degree of polarization of 99.95% or more.

This thin highly-functional polarizing layer can be produced by a process including forming a PVA-based resin coating on a resin substrate with a thickness of at least 20 µm, drying the coating to form a PVA-based resin layer, immersing the resulting PVA-based resin layer in a dyeing liquid containing a dichroic material to absorb the dichroic material to the PVA-based resin layer, and stretching the PVA-based resin layer, which contains the absorbed dichroic material, together with the resin substrate in an aqueous boric acid solution to a total stretch ratio of 5 times or more the original length.

A laminated film having a thin highly-functional polarizing layer containing an oriented dichroic material can be produced by a method including the steps of: coating a PVA-based resin-containing aqueous solution to one side of a resin substrate with a thickness of at least 20 µm, drying the coating to form a PVA-based resin layer so that a laminated film including the resin substrate and the PVA-based resin layer formed thereon is produced; immersing the laminated film in a dyeing liquid containing a dichroic material to absorb the dichroic material to the PVA-based resin layer in the laminated film, wherein the laminated film includes the resin substrate and the PVA-based resin layer formed on one side of the resin substrate; and stretching the laminated film, which has the PVA-based resin layer containing the absorbed dichroic material, in an aqueous boric acid solution to a total stretch ratio of 5 times or more the original length, wherein the PVA-based resin layer containing the absorbed dichroic material is stretched together with the resin substrate, so that a laminated film including the resin substrate and a thin highly-functional polarizing layer formed on one side of the resin substrate is produced, in which the thin highly-functional polarizing layer is made of the PVA-based resin layer containing the oriented dichroic material and has a thickness of 7 µm or less and the optical properties of a single transmittance of 42.0% or more and a degree of polarization of 99.95% or more.

The thin polarizing layer disclosed in the specification of Japanese Patent Application No. 2010-269002 or the specification of Japanese Patent Application No. 2010-263692 is a polarizing layer in the form of a continuous web including a PVA-based resin containing an oriented dichroic material, which is made with a thickness of 10 µm or less by a two-stage stretching process including auxiliary in-air stretching of a laminate and stretching of the laminate in an aqueous boric acid solution, wherein the laminate includes an amorphous ester-based thermoplastic resin substrate and a PVA-based resin layer formed thereon. This thin polarizing layer is preferably made to have optical properties satisfying the following requirements: $P > -(10^{0.929T-42.4}-1) \times 100$ (provided that $T<42.3$) and $P \geq 99.9$ (provided that $T \geq 42.3$), wherein T represents the single transmittance, and P represents the degree of polarization.

Specifically, the thin polarizing layer can be produced by a thin polarizing layer-manufacturing method including the steps of: performing elevated temperature in-air stretching of a PVA-based resin layer, so that a stretched intermediate product including an oriented PVA-based resin layer is produced, wherein the PVA-based resin layer is formed on an amorphous ester-based thermoplastic resin substrate in the form of a continuous web; absorbing a dichroic material (which is preferably iodine or a mixture of iodine and an organic dye) to the stretched intermediate product to produce a colored intermediate product including the PVA-based resin layer in which the dichroic material is oriented; and performing stretching of the colored intermediate product in an aqueous boric acid solution so that a polarizing layer with a thickness of 10 µm or less is produced, which includes the PVA-based resin layer containing the oriented dichroic material.

In this manufacturing method, the elevated temperature in-air stretching and the stretching in an aqueous boric acid solution are preferably performed in such a manner that the PVA-based resin layer formed on the amorphous ester-based thermoplastic resin substrate is stretched to a total stretch ratio of 5 times or more. The aqueous boric acid solution preferably has a temperature of 60° C. or more for the stretching therein. Before stretched in the aqueous boric acid solution, the colored intermediate product is preferably subjected to an insolubilization treatment, in which the colored intermediate product is preferably immersed in an aqueous boric acid solution with a temperature of 40° C. or less. The amorphous ester-based thermoplastic resin substrate may be made of amorphous polyethylene terephthalate including co-polyethylene terephthalate in which isophthalic acid, cyclohexanedimethanol, or any other monomer is copolymerized, and is preferably made of a transparent resin. The thickness of the substrate may be at least seven times the thickness of the PVA-based resin layer to be formed. The elevated temperature in-air stretching is preferably performed at a stretch ratio of 3.5 times or less, and the temperature of the elevated temperature in-air stretching is preferably equal to or higher than the glass transition temperature of the PVA-based resin. Specifically, it is preferably in the range of 95° C. to 150° C. When the elevated temperature in-air stretching is end-free uniaxial stretching, the PVA-based resin layer formed on the amorphous ester-based thermoplastic resin substrate is preferably stretched to a total stretch ratio of from 5 to 7.5 times. When the elevated temperature in-air stretching is fixed-end uniaxial stretching, the PVA-based resin layer formed on the amorphous ester-based thermoplastic resin substrate is preferably stretched to a total stretch ratio of from 5 to 8.5 times.

More specifically, the thin polarizing layer can be produced by the method described below.

A substrate in the form of a continuous web is prepared, which is made of co-polymerized polyethylene terephthalate (amorphous PET) in which 6 mol % of isophthalic acid is copolymerized. The amorphous PET has a glass transition temperature of 75° C. A laminate of a polyvinyl alcohol (PVA) layer and the amorphous PET substrate in the form of a continuous web is prepared as described below. Incidentally, the glass transition temperature of PVA is 80° C.

A 200 µm thick amorphous PET substrate is provided, and an aqueous 4-5% PVA solution is prepared by dissolving PVA powder with a polymerization degree of 1,000 or more and a saponification degree of 99% or more in water. Subsequently, the aqueous PVA solution is applied to a 200

μm thick amorphous PET substrate and dried at a temperature of 50 to 60° C. so that a laminate composed of the amorphous PET substrate and a 7 μm thick PVA layer formed thereon is obtained.

The laminate having the 7 μm thick PVA layer is subjected to a two-stage stretching process including auxiliary in-air stretching and stretching in an aqueous boric acid solution as described below, so that a thin highly-functional polarizing layer with a thickness of 3 μm is obtained. At the first stage, the laminate having the 7 μm thick PVA layer is subjected to an auxiliary in-air stretching step so that the layer is stretched together with the amorphous PET substrate to form a stretched laminate having a 5 μm thick PVA layer. Specifically, the stretched laminate is formed by a process including feeding the laminate having the 7 μm thick PVA layer to a stretching apparatus placed in an oven with the stretching temperature environment set at 130° C. and subjecting the laminate to end-free uniaxial stretching to a stretch ratio of 1.8 times. In the stretched laminate, the PVA layer is modified, by the stretching, into a 5 μm thick PVA layer containing oriented PVA molecules.

Subsequently, a dyeing step is performed to produce a colored laminate having a 5 μm thick PVA layer containing oriented PVA molecules and absorbed iodine. Specifically, the colored laminate is produced by immersing the stretched laminate for a certain time period in a dyeing liquid containing iodine and potassium iodide and having a temperature of 30° C. so that iodine can be absorbed to the PVA layer of the stretched laminate and that the PVA layer for finally forming a highly-functional polarizing layer can have a single transmittance of 40 to 44%. In this step, the dyeing liquid contains water as a solvent and has an iodine concentration in the range of 0.12 to 0.30% by weight and a potassium iodide concentration in the range of 0.7 to 2.1% by weight. The concentration ratio of iodine to potassium iodide is 1:7. It should be noted that potassium iodide is necessary to make iodine soluble in water. More specifically, the stretched laminate is immersed for 60 seconds in a dyeing liquid containing 0.30% by weight of iodine and 2.1% by weight of potassium iodide, so that a colored laminate is produced, in which the 5 μm thick PVA layer contains oriented PVA molecules and absorbed iodine.

At the second stage, the colored laminate is further subjected to a stretching step in an aqueous boric acid so that the layer is further stretched together with the amorphous PET substrate to form an optical film laminate having a 3 μm thick PVA layer, which forms a highly-functional polarizing layer. Specifically, the optical film laminate is formed by a process including feeding the colored laminate to a stretching apparatus placed in a treatment system in which an aqueous boric acid solution containing boric acid and potassium iodide is set in the temperature range of 60 to 85° C. and subjecting the laminate to end-free uniaxial stretching to a stretch ratio of 3.3 times. More specifically, the aqueous boric acid solution has a temperature of 65° C. In the solution, the boric acid content and the potassium iodide content are 4 parts by weight and 5 parts by weight, respectively, based on 100 parts by weight of water. In this step, the colored laminate having a controlled amount of absorbed iodine is first immersed in the aqueous boric acid solution for 5 to 10 seconds. Subsequently, the colored laminate is directly fed between a plurality of pairs of rolls different in peripheral speed, which form the stretching apparatus placed in the treatment system, and subjected to end-free uniaxial stretching for 30 to 90 seconds to a stretch ratio of 3.3 times. This stretching treatment converts the PVA layer of the colored laminate to a 3 μm thick PVA layer in which the absorbed iodine forms a polyiodide ion complex highly oriented in a single direction. This PVA layer forms a highly-functional polarizing layer in the optical film laminate.

A washing step, which is however not essential for the manufacture of the optical film laminate, is preferably performed, in which the optical film laminate is taken out of the aqueous boric acid solution, and boric acid deposited on the surface of the 3 μm thick PVA layer formed on the amorphous PET substrate is washed off with an aqueous potassium iodide solution. Subsequently, the washed optical film laminate is dried in a drying step using warm air at 60° C. It should be noted that the washing step is to prevent appearance defects such as boric acid precipitation.

A lamination and/or transfer step, which is also not essential for the manufacture of the optical film laminate, may also be performed, in which an 80 μm thick triacetylcellulose film is laminated to the surface of the 3 μm thick PVA layer formed on the amorphous PET substrate, while an adhesive is applied to the surface, and then the amorphous PET substrate is peeled off, so that the 3 μm thick PVA layer is transferred to the 80 μm thick triacetylcellulose film.

[Other Steps]

The thin polarizing layer-manufacturing method may include additional steps other than the above steps. For example, additional steps may include an insolubilization step, a crosslinking step, a drying step (moisture control), etc. Additional steps may be performed at any appropriate timing.

The insolubilization step is typically achieved by immersing the PVA-based resin layer in an aqueous boric acid solution. The insolubilization treatment can impart water resistance to the PVA-based resin layer. The concentration of boric acid in the aqueous boric acid solution is preferably from 1 to 4 parts by weight based on 100 parts by weight of water. The insolubilization bath (aqueous boric acid solution) preferably has a temperature of 20° C. to 50° C. Preferably, the insolubilization step is performed after the preparation of the laminate and before the dyeing step or the step of stretching in water.

The crosslinking step is typically achieved by immersing the PVA-based resin layer in an aqueous boric acid solution. The crosslinking treatment can impart water resistance to the PVA-based resin layer. The concentration of boric acid in the aqueous boric acid solution is preferably from 1 to 4 parts by weight based on 100 parts by weight of water. When the crosslinking step is performed after the dyeing step, an iodide is preferably added to the solution. The addition of an iodide can suppress the elution of absorbed iodine from the PVA-based resin layer. The amount of the addition of an iodide is preferably from 1 to 5 parts by weight based on 100 parts by weight of water. Examples of the iodide include those listed above. The temperature of the crosslinking bath (aqueous boric acid solution) is preferably from 20° C. to 50° C. Preferably, the crosslinking step is performed before the second stretching step in the aqueous boric acid solution. In a preferred embodiment, the dyeing step, the crosslinking step, and the second stretching step in the aqueous boric acid solution are performed in this order.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

An optical film may be exemplified as other optical layers, such as a reflective plate, a transflective plate, a retardation plate (a half wavelength plate and a quarter wavelength plate included), a viewing angle compensation film, a brightness enhancement film, a surface treatment film or the like, which may be used for formation of a liquid crystal display etc. These are used in practice as an optical film, or as one layer or two layers or more of optical layers laminated with polarizing plate.

The surface treatment film may also be provided on and bonded to a front face plate. Examples of the surface treatment film include a hard-coat film for use in imparting scratch resistance to the surface, an antiglare treatment film for preventing glare on image display devices, and an anti-reflection film such as an anti-reflective film or a low-reflective film, etc. The front face plate is provided on and bonded to the surface of an image display device such as a liquid crystal display device, an organic EL display device, a CRT, or a PDP to protect the image display device or to provide a high-grade appearance or a differentiated design. The front face plate is also used as a support for a λ/4 plate in a 3D-TV. In a liquid crystal display device, for example, the front face plate is provided above a polarizing plate on the viewer side. When the pressure-sensitive adhesive layer according to the present invention is used, the same effect can be produced using a plastic base material such as a polycarbonate or poly(methyl methacrylate) base material for the front face plate, as well as using a glass base material.

Although an optical film with the above described optical layer laminated to the polarizing plate may be formed by a method in which laminating is separately carried out sequentially in manufacturing process of a liquid crystal display device or the like, an optical film in a form of being laminated beforehand has an outstanding advantage that it has excellent stability in quality and assembly workability, and thus manufacturing processes ability of a liquid crystal display device or the like may be raised. Proper adhesion means, such as a pressure-sensitive adhesive layer, may be used for laminating. On the occasion of adhesion of the above described polarizing plate and other optical films, the optical axis may be set as a suitable configuration angle according to the target retardation characteristics or the like.

The pressure-sensitive adhesive optical film of the present invention is preferably used to form various types of image display devices such as liquid crystal display devices. Liquid crystal display devices may be produced according to conventional techniques. Specifically, liquid crystal display devices are generally produced by appropriately assembling a display panel such as a liquid crystal cell and the pressure-sensitive adhesive optical film and optionally other components such as a lighting system and incorporating a driving circuit according to any conventional technique, except that the pressure-sensitive adhesive optical film of the present invention is used. Any type of liquid crystal cell may also be used such as a TN type, an STN type, a n type, a VA type and an IPS type.

Suitable liquid crystal display devices, such as liquid crystal display device with which the above pressure-sensitive adhesive optical film has been provided on one side or both sides of the display panel such as a liquid crystal cell, and with which a backlight or a reflective plate is used for alighting system may be manufactured. In this case, the pressure-sensitive adhesive optical film of the present invention may be provided on one side or both sides of the display panel such as a liquid crystal cell. When providing the pressure-sensitive adhesive optical films on both sides, they may be of the same type or of different type. Furthermore, in assembling a liquid crystal display device, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display device: OLED) will be explained. Generally, in organic EL display device, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display device emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display device, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display device of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display device looks like mirror if viewed from outside.

In an organic EL display device containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display device is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Hereinafter, the present invention is more specifically described with reference to the examples, which however are not intended to limit the present invention. In each example, "parts" and "%" are all by weight.

Production Example 1

(Preparation of Monomer Emulsion)

To a vessel were added 949.5 parts of butyl acrylate, 50 parts of acrylic acid, and 0.5 parts of 3-methacryloyloxy-propyl-trimethoxysilane (KBM-503, manufactured by Shin-Etsu Chemical Co., Ltd.) as raw materials and mixed to form a monomer mixture. Subsequently, 24 parts of AQUALON HS-10 (manufactured by Dai-ichi Kogyo Seiyaku Co., Ltd.) as a reactive surfactant (anionic) and 382 parts of ion-exchanged water were added to 600 parts of the monomer mixture prepared with the above composition, and stirred at 6,000 (rpm) for 5 minutes using a homomixer (manufactured by PRIMIX Corporation), so that a monomer emulsion (1) was obtained.

Production Example 2

A monomer emulsion (2) was obtained as in Production Example 1, except that a monomer mixture of 649.5 parts of 2-ethylhexyl acrylate, 300 parts of methyl methacrylate, 50 parts of acrylic acid, and 0.5 parts of 3-methacryloyloxy-propyl-trimethoxysilane (KBM-503, manufactured by Shin-Etsu Chemical Co., Ltd.) was used instead.

Production Example 3

A monomer emulsion (3) was obtained as in Production Example 1, except that a monomer mixture of 949.5 parts of ethyl acrylate, 50 parts of acrylic acid, and 0.5 parts of 3-methacryloyloxypropyl-trimethoxysilane (KBM-503, manufactured by Shin-Etsu Chemical Co., Ltd.) was used instead.

Production Example 4

A monomer emulsion (4) was obtained as in Production Example 1, except that a monomer mixture of 799.5 parts of butyl acrylate, 150 parts of methyl acrylate, 50 parts of acrylic acid, and 0.5 parts of 3-methacryloyloxypropyl-trimethoxysilane (KBM-503, manufactured by Shin-Etsu Chemical Co., Ltd.) was used instead.

Production Example 5

A monomer emulsion (5) was obtained as in Production Example 1, except that a monomer mixture of 879.5 parts of butyl acrylate, 50 parts of cyclohexyl methacrylate, 50 parts of acrylic acid, 20 parts of mono[poly(propylene oxide) methacrylate]phosphate ester (Sipomer PAM-200 (trade name), manufactured by Rhodia Nicca Ltd.), and 0.5 parts of 3-methacryloyloxypropyl-trimethoxysilane (KBM-503, manufactured by Shin-Etsu Chemical Co., Ltd.) was used instead.

Production Example 6

A monomer emulsion (6) was obtained as in Production Example 1, except that a monomer mixture of 62.95 parts of butyl acrylate, 30 parts of methyl methacrylate, 50 parts of acrylic acid, 20 parts of mono[poly(propylene oxide) methacrylate]phosphate ester (Sipomer PAM-200 (trade name), manufactured by Rhodia Nicca Ltd.), and 0.5 parts of 3-methacryloyloxypropyl-trimethoxysilane (KBM-503, manufactured by Shin-Etsu Chemical Co., Ltd.) was used instead.

Production Example 7

A monomer emulsion (7) was obtained as in Production Example 1, except that a monomer mixture of 950 parts of butyl acrylate and 50 parts of acrylic acid was used instead.

Production Example 8

A monomer emulsion (8) was obtained as in Production Example 1, except that a monomer mixture of 950 parts of 2-ethylhexyl acrylate and 50 parts of acrylic acid was used instead.

Production Example 9

A monomer emulsion (9) was obtained as in Production Example 1, except that a monomer mixture of 530 parts of butyl acrylate, 420 parts of methyl methacrylate, and 50 parts of acrylic acid was used instead.

Production Example 10

A monomer emulsion (10) was obtained as in Production Example 1, except that a monomer mixture of 950 parts of lauryl methacrylate and 50 parts of acrylic acid was used instead.

Production Example 11

A monomer emulsion (11) was obtained as in Production Example 1, except that a monomer mixture of 900 parts of methyl methacrylate, 80 parts of butyl acrylate, and 20 parts of acrylic acid was used instead.

Production Example 12

A monomer emulsion (12) was obtained as in Production Example 1, except that a monomer mixture of 900 parts of methyl methacrylate, 80 parts of 2-ethylhexyl acrylate, and 20 parts of acrylic acid was used instead.

Production Example 13

A monomer emulsion (13) was obtained as in Production Example 1, except that a monomer mixture of 900 parts of methyl methacrylate, 80 parts of ethyl acrylate, and 20 parts of acrylic acid was used instead.

Production Example 14

A monomer emulsion (14) was obtained as in Production Example 1, except that a monomer mixture of 900 parts of methyl methacrylate, 79 parts of butyl acrylate, 20 parts of acrylic acid, and 1 part of 3-methacryloyloxypropyl-trimethoxysilane (KBM-503, manufactured by Shin-Etsu Chemical Co., Ltd.) was used instead.

Production Example 15

A monomer emulsion (15) was obtained as in Production Example 1, except that a monomer mixture of 979 parts of tert-butyl methacrylate, 20 parts of acrylic acid, and 1 part of 3-methacryloyloxypropyl-trimethoxysilane (KBM-503, manufactured by Shin-Etsu Chemical Co., Ltd.) was used instead.

Production Example 16

A monomer emulsion (16) was obtained as in Production Example 1, except that a monomer mixture of 979 parts of isobornyl methacrylate, 20 parts of acrylic acid, and 1 part of 3-methacryloyloxypropyl-trimethoxysilane (KBM-503, manufactured by Shin-Etsu Chemical Co., Ltd.) was used instead.

Production Example 17

A monomer emulsion (17) was obtained as in Production Example 1, except that a monomer mixture of 650 parts of methyl methacrylate, 329 parts of butyl acrylate, 20 parts of acrylic acid, and 1 part of 3-methacryloyloxypropyl-trimethoxysilane (KBM-503, manufactured by Shin-Etsu Chemical Co., Ltd.) was used instead.

Production Example 18

A monomer emulsion (18) was obtained as in Production Example 1, except that a monomer mixture of 970 parts of styrene, 20 parts of acrylic acid, and 1 part of divinylbenzene was used instead.

Example 1

Preparation of Aqueous Dispersion-Type Pressure-Sensitive Adhesive Composition

To a reaction vessel equipped with a condenser tube, a nitrogen-introducing tube, a thermometer, a dropping funnel, and a stirring blade were added 200 parts of the monomer emulsion (9) prepared as described above and 330 parts of ion-exchanged water. Subsequently, after the space in the reaction vessel was replaced with nitrogen gas sufficiently, 0.6 parts of ammonium persulfate was added to the vessel, and the mixture was subjected to polymerization at 60° C. for 1 hour with stirring, so that a copolymer for forming a core layer was obtained. Subsequently, 800 parts of the monomer emulsion (1) was added dropwise to the reaction vessel over 3 hours, while the reaction vessel was kept at 60° C. The mixture was then subjected to polymerization for 3 hours to form a shell layer, so that an aqueous dispersion with a solid concentration of 46.2% containing polymer emulsion particles of a core-shell structure was obtained. Subsequently, after the aqueous dispersion containing polymer emulsion particles was cooled to room temperature, 30 parts of 10% ammonia water was added thereto to adjust the pH and the solid concentration to 7.5 and 45.4%, respectively, so that an aqueous dispersion-type pressure-sensitive adhesive composition containing emulsion particles of a core-shell structure was obtained.

(Formation of Pressure-Sensitive Adhesive Layer and Preparation of Pressure-Sensitive Adhesive-Type Polarizing Plate)

The aqueous dispersion-type pressure-sensitive adhesive composition containing emulsion particles of a core-shell structure was applied to a release film (Diafoil MRF-38, manufactured by Mitsubishi Chemical Polyester Co., Ltd., a polyethylene terephthalate backing) with a die coater so that a 20 μm thick coating could be formed after drying, and then the coating was dried at 120° C. for 5 minutes to form a pressure-sensitive adhesive layer. The pressure-sensitive adhesive layer was bonded to a polarizing plate (SEG-DU (product name) manufactured by NITTO DENKO CORPORATION), so that a pressure-sensitive adhesive-type polarizing plate was obtained. The polarizer used in the polarizing plate had a thickness of 28 μm, and triacetylcellulose films provided as transparent protective films on both sides of the polarizer each had a thickness of 80 μm.

Examples 2 to 15 and Comparative Examples 1 to 5

Aqueous dispersion-type pressure-sensitive adhesive compositions each containing emulsion particles of a core-shell structure were obtained as in Example 1, except that the type of the monomer emulsions for forming the core and shell layers and the contents thereof were changed as shown in Table 1. Pressure-sensitive adhesive layers and pressure-sensitive adhesive-type polarizing plates were also formed and prepared as in Example 1, except that the above aqueous dispersion-type pressure-sensitive adhesive compositions each containing emulsion particles of a core-shell structure were used instead.

Table 1 shows the glass transition temperatures (theoretical values based on the FOX equation) of the (meth)acryl-based copolymer emulsions obtained from the monomer emulsions (1) to (17) prepared in Production Examples 1 to 17, respectively, and the glass transition temperature (theoretical value based on the FOX equation) of the styrene-based copolymer emulsion obtained from the monomer emulsion (18) prepared in Production Example 18. Table 1 also shows the monomer components of each (meth)acryl-based copolymer, the contents (% by weight) of the monomer components, and the solid concentration (% by weight) of each aqueous dispersion-type pressure-sensitive adhesive composition containing emulsion particles of a core-shell structure.

In Table 1, the aqueous dispersion-type pressure-sensitive adhesive compositions containing emulsion particles of a core-shell structure, exclusive of the composition of Comparative Example 6, are each prepared from (meth)acryl-based copolymers different in Tg, in which the copolymer with a relatively low Tg is indicated as low-Tg (meth)acryl-based copolymer (A), and the copolymer with a relatively high Tg is indicated as high-Tg (meth)acryl-based copolymer (B). The (meth)acryl-based copolymer weight ratio (A)/(B) shown in Table 1 is the solid weight ratio calculated when the total weight of the (meth)acryl-based copolymers (A) and (B) is normalized as 100 (parts by weight).

<Preparation of Thin Polarizing Layer and Preparation of Polarizing Plate Using the Same>

A process for forming a thin polarizing later was performed. In the process, a laminate including an amorphous PET substrate and a 24 μm thick PVA layer formed thereon was first subjected to auxiliary in-air stretching at a stretching temperature of 130° C. to form a stretched laminate. Subsequently, the stretched laminate was subjected to dyeing to form a colored laminate, and the colored laminate was subjected to stretching in an aqueous boric acid solution at a stretching temperature of 65° C. to a total stretch ratio of 5.94times, so that an optical film laminate was obtained, which had a 10 μm thick PVA layer stretched together with the amorphous PET substrate. Such two-stage stretching successfully formed an optical film laminate having a 10 μm thick PVA layer, which was formed on the amorphous PET substrate, contained highly oriented PVA molecules in the PVA layer, and formed a highly-functional polarizing layer in which iodine adsorbed by the dyeing formed a polyiodide ion complex oriented highly in a single direction. An 80 μm thick saponified triacetylcellulose film was further bonded to the surface of the polarizing layer of the optical film laminate, while a polyvinyl alcohol-based adhesive was applied to the surface, and then the amorphous PET substrate was peeled off, so that a polarizing plate with a thin polarizing layer was obtained.

Example 16

A pressure-sensitive adhesive-type polarizing plate was prepared as in Example 1, except that the above polarizing plate with the thin polarizing layer was used instead in the formation of the pressure-sensitive adhesive layer and the preparation of the pressure-sensitive adhesive-type polarizing plate.

Comparative Example 6

To a reaction vessel equipped with a condenser tube, a nitrogen-introducing tube, a thermometer, a dropping funnel, and a stirring blade were added 200 parts of a portion of the monomer emulsion (5) prepared in Production Example 5 and 330 parts of ion-exchanged water. Subsequently, after the space in the reaction vessel was replaced with nitrogen gas sufficiently, 0.6 parts of ammonium persulfate was added to the vessel, and the mixture was subjected to polymerization at 60° C. for 1 hour with stirring. Subsequently, the remaining portion of the monomer emulsion was added dropwise to the reaction vessel over 3 hours, while the reaction vessel was kept at 60° C. The mixture was then subjected to polymerization for 3 hours to give a polymer emulsion with a solid concentration of 46.2%. Subsequently, after the polymer emulsion was cooled to room temperature, 30 parts of 10% ammonia water was added thereto to adjust the pH and the solid concentration to 7.5 and 45.1%, respectively, so that a (meth)acryl-based copolymer emulsion was obtained. Using the (meth)acryl-based copolymer emulsion, a pressure-sensitive adhesive layer and a pressure-sensitive adhesive-type polarizing plate were also formed and prepared as in Example 1.

The pressure-sensitive adhesive-type polarizing plates obtained in the examples and the comparative examples were evaluated as described below. The evaluation results are shown in Table 2.

[Durability Against Moisture<Moisture-Induced Peeling>]

The pressure-sensitive adhesive-type polarizing plate of each of the examples and the comparative examples was cut into a 15 inch size piece, which was bonded to a 0.7 mm thick non-alkali glass plate (Corning #1737, manufactured by Corning Incorporated) and allowed to stand for 15 minutes in an autoclave at 50° C. and 0.5 MPa. Subsequently, it was treated under an environment at 60° C. and 90% R.H. for 500 hours. Immediately after it was taken out of the environment and transferred to room temperature conditions (23° C. and 55% R.H.), the degree of peeling between the treated pressure-sensitive adhesive-type polarizing plate and the non-alkali glass was visually observed and evaluated according to the criteria below.

5: No peeling occurred.
4: Peeling occurred from the end of the pressure-sensitive adhesive-type polarizing plate to a site within 0.5 mm from the end.
3: Peeling occurred from the end of the pressure-sensitive adhesive-type polarizing plate to a site within 1.0 mm from the end.
2: Peeling occurred from the end of the pressure-sensitive adhesive-type polarizing plate to a site within 3.0 mm from the end.
1: Peeling occurred from the end of the pressure-sensitive adhesive-type polarizing plate to a site 3.0 mm or more from the end.

[Durability Against High-Temperature and Moisture<Peeling Over Time>]

The pressure-sensitive adhesive-type polarizing plate of each of the examples and the comparative examples was cut into a 15 inch size piece, which was bonded to a 0.7 mm thick non-alkali glass plate (Corning #1737, manufactured by Corning Incorporated) and allowed to stand for 15 minutes in an autoclave at 50° C. and 0.5 MPa. Subsequently, it was treated under an environment at 85° C. and 85% R.H. for 100 hours. Immediately after it was taken out of the environment and transferred to room temperature conditions (23° C. and 55% R.H.), the degree of peeling between the treated pressure-sensitive adhesive-type polarizing plate and the non-alkali glass was visually observed and evaluated according to the criteria below. At this stage, all examples were ranked on a scale of "5" with no peeling observed. Subsequently, after it was transferred to room temperature conditions (23° C. and 55% R.H.) and stored for 240 hours, the degree of peeling between the treated pressure-sensitive adhesive-type polarizing plate and the non-alkali glass was visually observed and evaluated according to the criteria below.

5: No peeling occurred.
4: Peeling occurred from the end of the pressure-sensitive adhesive-type polarizing plate to a site within 0.5 mm from the end.
3: Peeling occurred from the end of the pressure-sensitive adhesive-type polarizing plate to a site within 1.0 mm from the end.
2: Peeling occurred from the end of the pressure-sensitive adhesive-type polarizing plate to a site within 3.0 mm from the end.
1: Peeling occurred from the end of the pressure-sensitive adhesive-type polarizing plate to a site 3.0 mm or more from the end.

[Haze]

The 20 μm thick pressure-sensitive adhesive layer obtained in each example, which was formed on the release film, was cut into a size of 50 mm×50 mm. A pressure-sensitive adhesive layer was also formed as in each example described above, except that the thickness of the pressure-sensitive adhesive was changed to 200 μm, and the resulting pressure-sensitive adhesive layer was cut into a size of 50 mm×50 mm. Each pressure-sensitive adhesive layer was peeled off from the release film and measured, in the atmosphere of 25° C., for haze (%) using HAZE METER HM-150 manufactured by Murakami Color Research Laboratory according to JIS K 7136. Table 1 shows the haze (H20) of the 20 μm thick pressure-sensitive adhesive layer, the haze (H200) of the 200 μm thick pressure-sensitive adhesive layer, and the ratio (H200)/(H20).

TABLE 1

| | Low-Tg (meth)acryl-based copolymer (A) | | | | High-Tg (meth)acryl-based copolymer (B) | |
|---|---|---|---|---|---|---|
| | Type | Composition | Weight ratio (%) | Tg (° C.) | Type | Composition |
| Example 1 | Production Example 1 | BA/AA/KBM503 | 94.95/5/0.05 | −40 | Production Example 11 | MMA/BA/AA |
| Example 2 | Production Example 2 | 2EHA/MMA/AA/KBM503 | 64.95/30/5/0.05 | −17 | Production Example 12 | MMA/2EHA/AA |
| Example 3 | Production Example 3 | EA/AA/KBM503 | 94.95/5/0.05 | −16 | Production Example 13 | MMA/EA/AA |
| Example 4 | Production Example 4 | BA/MA/AA/KBM503 | 79.95/15/5/0.05 | −12 | Production Example 11 | MMA/BA/AA |
| Example 5 | Production Example 5 | BA/CHMA/AA/PAM200/KBM503 | 87.95/5/5/2/0.05 | −36 | Production Example 11 | MMA/BA/AA |
| Example 6 | Production Example 5 | BA/CHMA/AA/PAM200/KBM503 | 87.95/5/5/2/0.05 | −36 | Production Example 14 | MMA/BA/AA/KBM503 |
| Example 7 | Production Example 5 | BA/CHMA/AA/PAM200/KBM503 | 87.95/5/5/2/0.05 | −36 | Production Example 15 | t-BMA/AA/KBM503 |
| Example 8 | Production Example 5 | BA/CHMA/AA/PAM200/KBM503 | 87.95/5/5/2/0.05 | −36 | Production Example 16 | IBXMA/AA/KBM503 |
| Example 9 | Production Example 6 | BA/MMA/AA/PAM200/KBM503 | 62.95/30/5/2/0.05 | −7 | Production Example 14 | MMA/BA/AA/KBM503 |
| Example 10 | Production Example 5 | BA/CHMA/AA/PAM200/KBM503 | 87.95/5/5/2/0.05 | −36 | Production Example 17 | MMA/BA/AA/KBM503 |
| Example 11 | Production Example 5 | BA/CHMA/AA/PAM200/KBM503 | 87.95/5/5/2/0.05 | −36 | Production Example 14 | MMA/BA/AA/KBM503 |
| Example 12 | Production Example 7 | BA/AA | 95/5 | −40 | Production Example 14 | MMA/BA/AA/KBM503 |
| Example 13 | Production Example 5 | BA/CHMA/AA/PAM200/KBM503 | 87.95/5/5/2/0.05 | −36 | Production Example 14 | MMA/BA/AA/KBM503 |
| Example 14 | Production Example 7 | BA/AA | 95/5 | −40 | Production Example 11 | MMA/BA/AA |
| Example 15 | Production Example 8 | 2HEA/AA | 95/5 | −50 | Production Example 14 | MMA/BA/AA/KBM503 |
| Comparative Example 1 | Production Example 9 | BA/MMA/AA | 53/42/5 | 7 | Production Example 14 | MMA/BA/AA/KBM503 |
| Comparative Example 2 | Production Example 10 | LMA/AA | 95/5 | −60 | Production Example 14 | MMA/BA/AA/KBM503 |
| Comparative Example 3 | Production Example 5 | BA/CHMA/AA/PAM200/KBM503 | 87.95/5/5/2/0.05 | −36 | Production Example 14 | MMA/BA/AA/KBM503 |
| Comparative Example 4 | Production Example 5 | BA/CHMA/AA/PAM200/KBM503 | 87.95/5/5/2/0.05 | −36 | Production Example 14 | MMA/BA/AA/KBM503 |

TABLE 1-continued

| | | | | | | |
|---|---|---|---|---|---|---|
| Comparative Example 5 | Production Example 5 | BA/CHMA/AA/PAM200/KBM503 | 87.95/5/5/2/0.05 | −36 | Production Example 18 | St/AA/DVB |
| Comparative Example 6 | Production Example 5 | BA/CHMA/AA/PAM200/KBM503 | 87.95/5/5/2/0.05 | −36 | — | — |

| | High-Tg (meth)acryl-based copolymer (B) | | (Meth)acryl-based copolymer weight ratio (A)/(B) | Core/shell structure | | Solid concentration (%) of aqueous dispersion-type pressure-sensitive adhesive composition |
|---|---|---|---|---|---|---|
| | Weight ratio (%) | Tg (° C.) | | Core layer | Shell layer | |
| Example 1 | 90/8/2 | 86 | 80/20 | B | A | 45.4 |
| Example 2 | 90/8/2 | 84 | 80/20 | B | A | 45.2 |
| Example 3 | 90/8/2 | 91 | 80/20 | B | A | 45.5 |
| Example 4 | 90/8/2 | 86 | 80/20 | B | A | 45.6 |
| Example 5 | 90/8/2 | 86 | 80/20 | B | A | 45.5 |
| Example 6 | 90/7.9/2/0.1 | 86 | 80/20 | B | A | 45.6 |
| Example 7 | 97.9/2/0.1 | 107 | 80/20 | B | A | 45.4 |
| Example 8 | 97.9/2/0.1 | 178 | 80/20 | B | A | 45.4 |
| Example 9 | 90/7.9/2/0.1 | 86 | 80/20 | B | A | 45.5 |
| Example 10 | 65/32.9/2/0.1 | 38 | 80/20 | B | A | 45.6 |
| Example 11 | 90/7.9/2/0.1 | 86 | 90/10 | B | A | 45.5 |
| Example 12 | 90/7.9/2/0.1 | 86 | 50/50 | B | A | 45.3 |
| Example 13 | 90/7.9/2/0.1 | 86 | 80/20 | A | B | 45.5 |
| Example 14 | 90/8/2 | 86 | 80/20 | B | A | 45.5 |
| Example 15 | 90/7.9/2/0.1 | 86 | 80/20 | B | A | 45.2 |
| Comparative Example 1 | 90/7.9/2/0.1 | 86 | 80/20 | B | A | 45.5 |
| Comparative Example 2 | 90/7.9/2/0.1 | 86 | 80/20 | B | A | 45.0 |
| Comparative Example 3 | 90/7.9/2/0.1 | 86 | 95/5 | B | A | 45.6 |
| Comparative Example 4 | 90/7.9/2/0.1 | 86 | 30/70 | B | A | 45.5 |
| Comparative Example 5 | 97/2/1 | 100 | 80/20 | B | A | 45.2 |
| Comparative Example 6 | — | — | 100/0 | B | A | 45.6 |

TABLE 2

| | Moisture durability | | Haze | | |
|---|---|---|---|---|---|
| | | | Haze (H20) | Haze (H200) | |
| | Moisture-induced peeling | Peeling over time | (%) of 20 µm thick piece | (%) of 200 µm thick piece | Ratio (H200)/(H20) |
| Example 1 | 5 | 5 | 0.4 | 0.5 | 1.25 |
| Example 2 | 4 | 5 | 0.8 | 1.1 | 1.38 |
| Example 3 | 4 | 5 | 0.8 | 1.0 | 1.25 |
| Example 4 | 3 | 5 | 0.5 | 0.6 | 1.20 |
| Example 5 | 5 | 5 | 0.4 | 0.4 | 1.00 |
| Example 6 | 5 | 5 | 0.4 | 0.4 | 1.00 |
| Example 7 | 4 | 5 | 0.7 | 1.0 | 1.43 |
| Example 8 | 3 | 5 | 0.8 | 1.3 | 1.63 |
| Example 9 | 3 | 5 | 0.6 | 0.8 | 1.33 |
| Example 10 | 4 | 4 | 0.7 | 1.0 | 1.43 |
| Example 11 | 5 | 3 | 0.4 | 0.4 | 1.00 |
| Example 12 | 3 | 5 | 0.7 | 1.4 | 2.00 |
| Example 13 | 3 | 5 | 0.4 | 0.6 | 1.50 |
| Example 14 | 4 | 4 | 0.4 | 0.5 | 1.25 |
| Example 15 | 5 | 3 | 0.8 | 1.2 | 1.50 |
| Comparative Example 1 | 2 | 5 | 0.8 | 1.5 | 1.88 |
| Comparative Example 2 | 5 | 2 | 1.1 | 2.4 | 2.18 |
| Comparative Example 3 | 5 | 2 | 0.2 | 0.2 | 1.00 |
| Comparative Example 4 | 1 | 5 | 1.0 | 1.9 | 1.90 |
| Comparative Example 5 | 5 | 5 | 1.3 | 3.2 | 2.46 |
| Comparative Example 6 | 5 | 1 | 0.2 | 0.2 | 1.00 |

It is apparent from Tables 1 and 2 that the pressure-sensitive adhesive optical films (pressure-sensitive adhesive-type polarizing plates) of the examples have high transparency and good durability against moisture and exhibit satisfactory results on both moisture-induced peeling and peeling over time. Example 16 also showed the same level of moisture durability as Example 1, except that it had a thin polarizing layer. In contrast, Comparative Examples 1 to 5 do not exhibit satisfactory results on each of moisture-induced peeling and peeling over time, because they do not satisfy any one of the requirements with respect to the glass transition temperatures and contents of the (meth)acryl-based copolymers (A) and (B) according to the present invention. The pressure-sensitive adhesive layer has a high haze value in Comparative Example 6 where a styrene-based copolymer containing styrene as a major monomer unit is used in place of the (meth)acryl-based copolymer (B) having a high glass transition temperature Tg.

In the table, BA represents butyl acrylate (228.15 K), AA: acrylic acid (379.15 K), 2EHA: 2-ethylhexyl acrylate (218.15 K), EA: ethyl acrylate (253.15 K), CHMA: cyclohexyl methacrylate (339.15 K), KBM503: 3-methacryloyloxypropyl-trimethoxysilane (KBM-503, manufactured by Shin-Etsu Chemical Co., Ltd.), PAM200: mono[poly(propylene oxide) methacrylate]phosphate ester (Sipomer PAM-200 (trade name), manufactured by Rhodia Nicca Ltd.) (273.15 K), MMA: methyl methacrylate (378.15 K), t-BMA tert-butyl methacrylate (380.15 K), IBXMA isobornyl: methacrylate (453.15 K), LMA: lauryl methacrylate (208.15 K), and St: styrene (373.15 K). Each parenthesized temperature is the glass transition temperature (K) of a homopolymer of each monomer, which is used in the calculation of the glass transition temperatures.

FIG. 1 is a 3D-TEM image showing emulsion particles of a core-shell structure in Example 6. The image has a size of 355 nm×355 nm. The core layer is designated as MMA, and the shell layer is designated as BA.

The invention claimed is:

1. An aqueous dispersion-type pressure-sensitive adhesive composition for an optical film, comprising emulsion particles of a core-shell structure, wherein
   the emulsion particles comprise:
   a (meth)acryl-based copolymer (A) containing an alkyl (meth)acrylate as a monomer unit and having a glass transition temperature of −55° C. to 0° C.; and a (meth)acryl-based copolymer (B) containing an alkyl (meth)acrylate as a monomer unit and having a glass transition temperature of 70° C. to 180° C.;
   wherein the glass transition temperature is calculated based on monofunctional monomers for monomer units,
   in a single emulsion particle, one of the (meth)acryl-based copolymers (A) and (B) forms a core layer, and another of the copolymers (A) and (B) forms a shell layer,
   at least one of the (meth)acryl-based copolymers (A) and (B) contains a carboxyl group-containing monomer as a monomer unit,
   a difference of the glass transition temperatures between the (meth)acryl-based copolymers (A) and (B) is 50° C. or more,
   a ratio (A)/(B) by weight of the (meth)acryl-based copolymers (A) and (B) is in the range of 50/50 to 90/10, and
   the (meth) acryl-based copolymers (B) contains a alkyl methacrylate as a monomer unit and the content of the alkyl methacrylate is 60 to 99.9% by weight of all monomer units in the (meth) acryl-based copolymer (B).

2. The aqueous dispersion-type pressure-sensitive adhesive composition for an optical film according to claim 1, wherein the (meth)acryl-based copolymer (B) forms the core layer, and the (meth)acryl-based copolymer (A) forms the shell layer.

3. The aqueous dispersion-type pressure-sensitive adhesive composition for an optical film according to claim 1,
   wherein at least one of the (meth)acryl-based copolymers (A) and (B) contains an alkoxysilyl group-containing monomer as a monomer unit and
   wherein the alkoxysilyl group-containing monomer is excluded from the monofunctional monomers for calculation of the glass transition temperature, and
   wherein a content of the alkoxysilyl group-containing monomer is 0.001 to 1% by weight of all monomer units in the (meth)acryl-based copolymer (A) or (B).

4. The aqueous dispersion-type pressure-sensitive adhesive composition for an optical film according to claim 1, wherein at least one of the (meth)acryl-based copolymers (A) and (B) contains a phosphate group-containing monomer as a monomer unit.

5. The aqueous dispersion-type pressure-sensitive adhesive composition for an optical film according to claim 4, wherein a content of the phosphate group-containing monomer is 0.1 to 20% by weight of all monomer units in the (meth)acryl-based copolymer (A) or (B).

6. The aqueous dispersion-type pressure-sensitive adhesive composition for an optical film according to claim 1, wherein the emulsion particles of a core-shell structure are obtained by a process comprising performing emulsion polymerization of monomers for monomer units of the copolymer for the core layer to form the copolymer for the core layer and then performing emulsion polymerization of monomers for monomer units of the copolymer for the shell layer to form the copolymer for the shell layer.

7. A pressure-sensitive adhesive layer for an optical film obtained by a process comprising applying the aqueous dispersion-type pressure-sensitive adhesive composition for an optical film according to claim 1 to a substrate and then drying the composition.

8. The pressure-sensitive adhesive layer for an optical film according to claim 7, which has a haze (H20) of 0 to 1% when having a thickness of 20 μm.

9. The pressure-sensitive adhesive layer for an optical film according to claim 8, which has a ratio of a haze (H200) to the haze (H20) of 2 or less, wherein the haze (H200) is a haze of the pressure-sensitive adhesive layer with a thickness of 200 μm.

10. A pressure-sensitive adhesive optical film, comprising an optical film and the pressure-sensitive adhesive layer for an optical film according to claim 7 placed on at least one side of the optical film.

11. The pressure-sensitive adhesive optical film according to claim 10, wherein the optical film is a polarizing plate comprising a polarizer and a transparent protective film or films provided on one or both sides of the polarizer.

12. The pressure-sensitive adhesive optical film according to claim 11, wherein the polarizer has a thickness of 10 μm or less.

13. An image display device comprising at least one piece of the pressure-sensitive adhesive optical film according to claim 10.

14. The aqueous dispersion-type pressure-sensitive adhesive composition for an optical film according to claim 1, wherein the difference of the glass transition temperatures between the (meth) acryl-based copolymers (A) and (B) is 100° C. or more.

15. The aqueous dispersion-type pressure-sensitive adhesive composition for an optical film according to claim 1, wherein the alkyl (meth)acrylate is selected from a group consisting of methyl (meth) acrylate, ethyl (meth) acrylate, propyl (meth) acrylate, n-butyl (meth) acrylate, tert-butyl (meth) acrylate, n-hexyl (meth) acrylate, cyclohexyl (meth) acrylate, 2-ethylhexyl (meth) acrylate, n-octyl (meth) acrylate, lauryl (meth) acrylate, tridecyl (meth) acrylate and stearyl (meth) acrylate.

16. A method of producing the aqueous dispersion-type pressure-sensitive adhesive composition for an optical film according to claim 1, comprising the steps of:
   performing emulsion polymerization of monomers for monomer units of a copolymer for a core layer to form the copolymer for the core layer; and then performing emulsion polymerization of monomers for monomer units of a copolymer for a shell layer to form the copolymer for the shell layer, so that emulsion particles of a core-shell structure are produced in such a manner that a single emulsion particle includes the copolymer for the core layer and the copolymer for the shell layer, wherein one of the copolymers for the core layer and the shell layer is a (meth)acryl-based copolymer (A) containing an alkyl (meth)acrylate as a monomer unit and having a glass transition temperature of −55° C. to 0° C. (wherein the glass transition temperature is calculated based on monofunctional monomers for monomer units), another of the copolymers for the core layer and the shell layer is a (meth)acryl-based copolymer (B) containing an alkyl (meth)acrylate as a monomer unit and having a glass transition temperature of 0° C. to 180° C. (wherein the glass transition temperature is calculated based on monofunctional monomers for monomer units), at least one of the (meth)acryl-based copolymers (A) and (B) contains a carboxyl group-containing monomer as a monomer unit, a difference of the glass transition temperatures between the (meth)acryl-based copolymers (A) and (B) is 50° C. or more, and a ratio (A)/(B) (by weight) of the (meth)acryl-based copolymers (A) and (B) is in the range of 50/50 to 90/10.

* * * * *